Oct. 16, 1962

E. R. TRIBKEN 3,058,697

AUTOMATIC PILOT

Filed March 25, 1959

INVENTOR
EVERETT R. TRIBKEN
BY *Henry Huff*
ATTORNEY

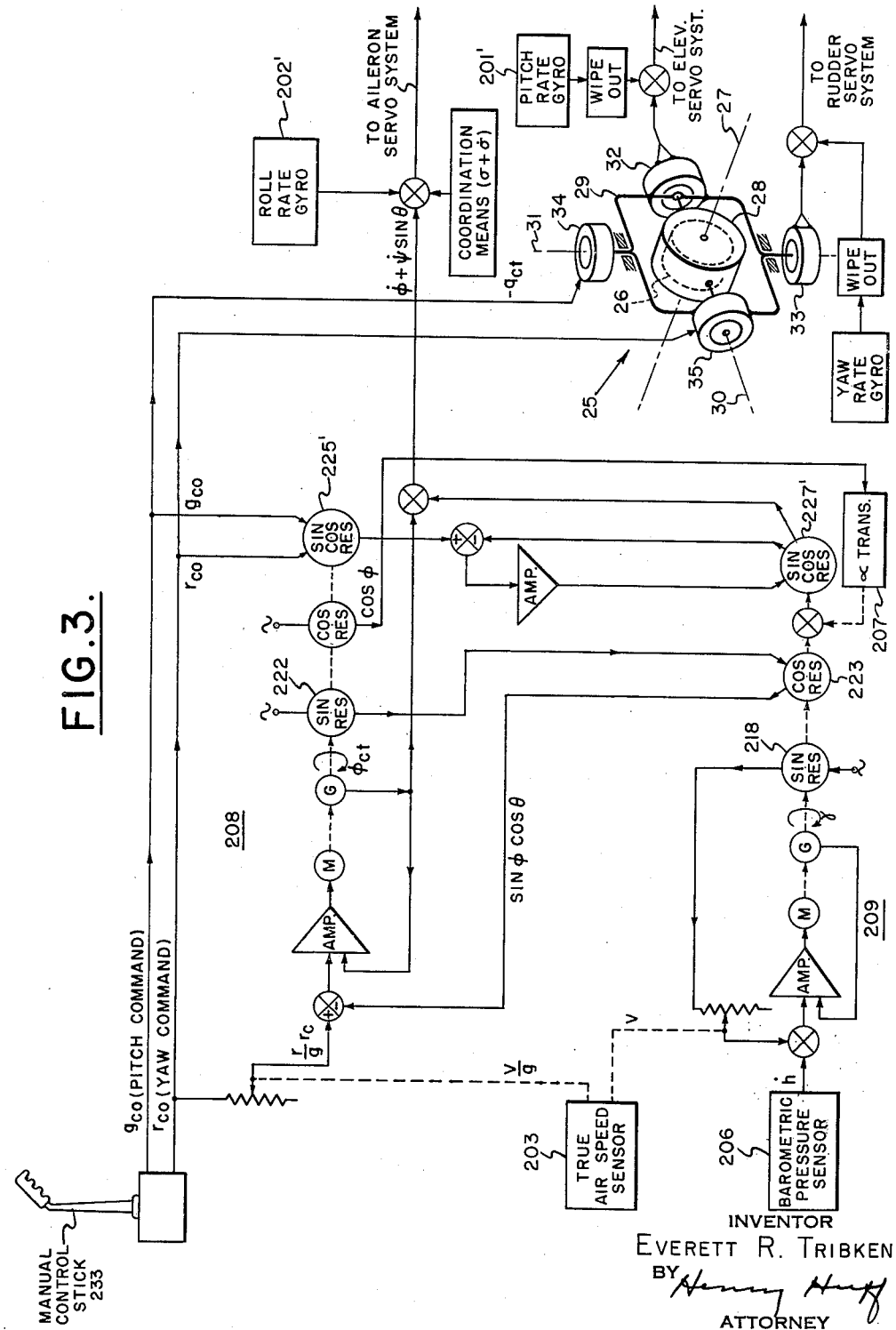

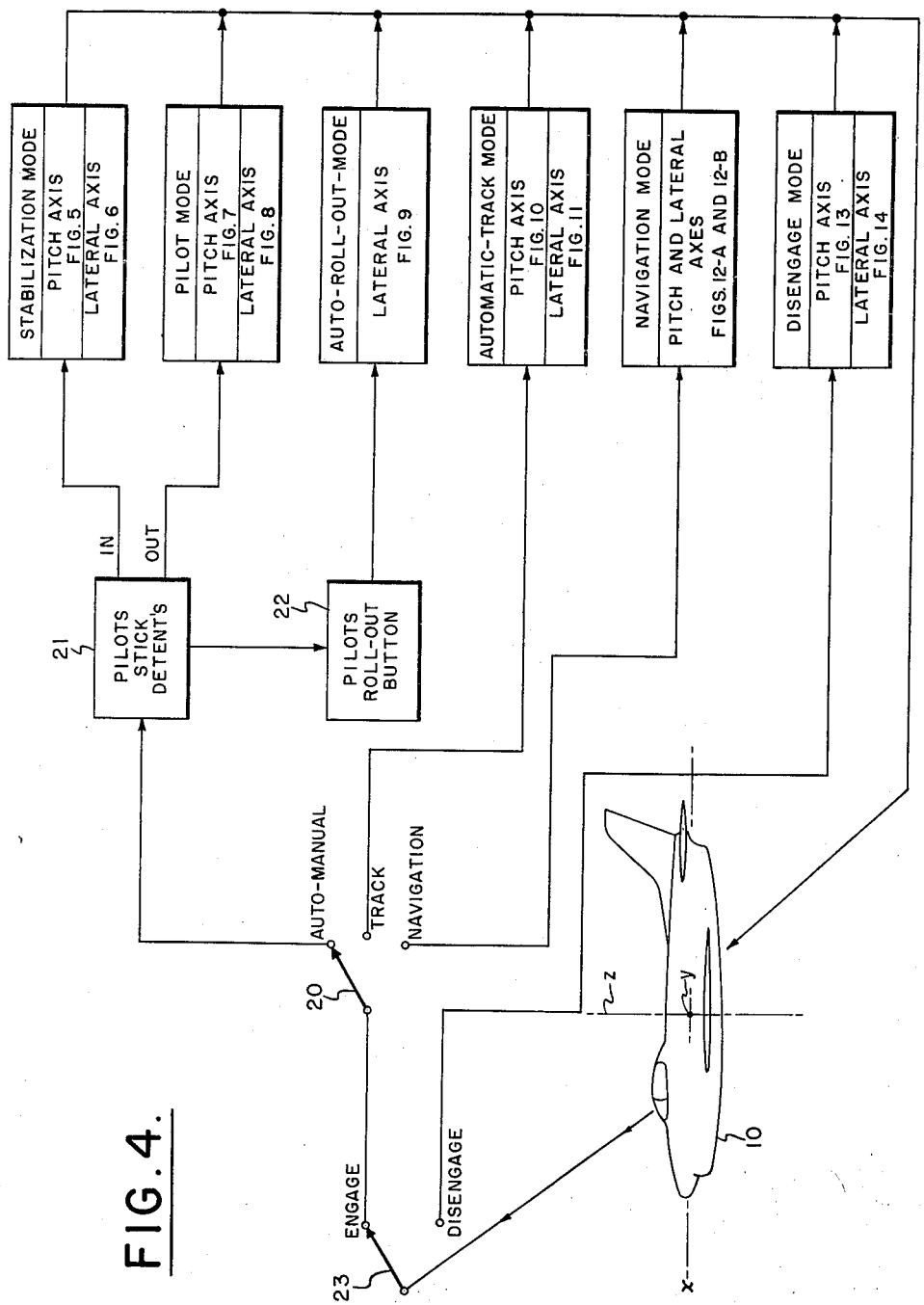

PITCH-AXIS STABILIZATION SYSTEM

LATERAL AXIS STABILIZATION SYSTEM

PITCH AXIS
PILOT MODE

PITCH AXIS
DISENGAGE MODE

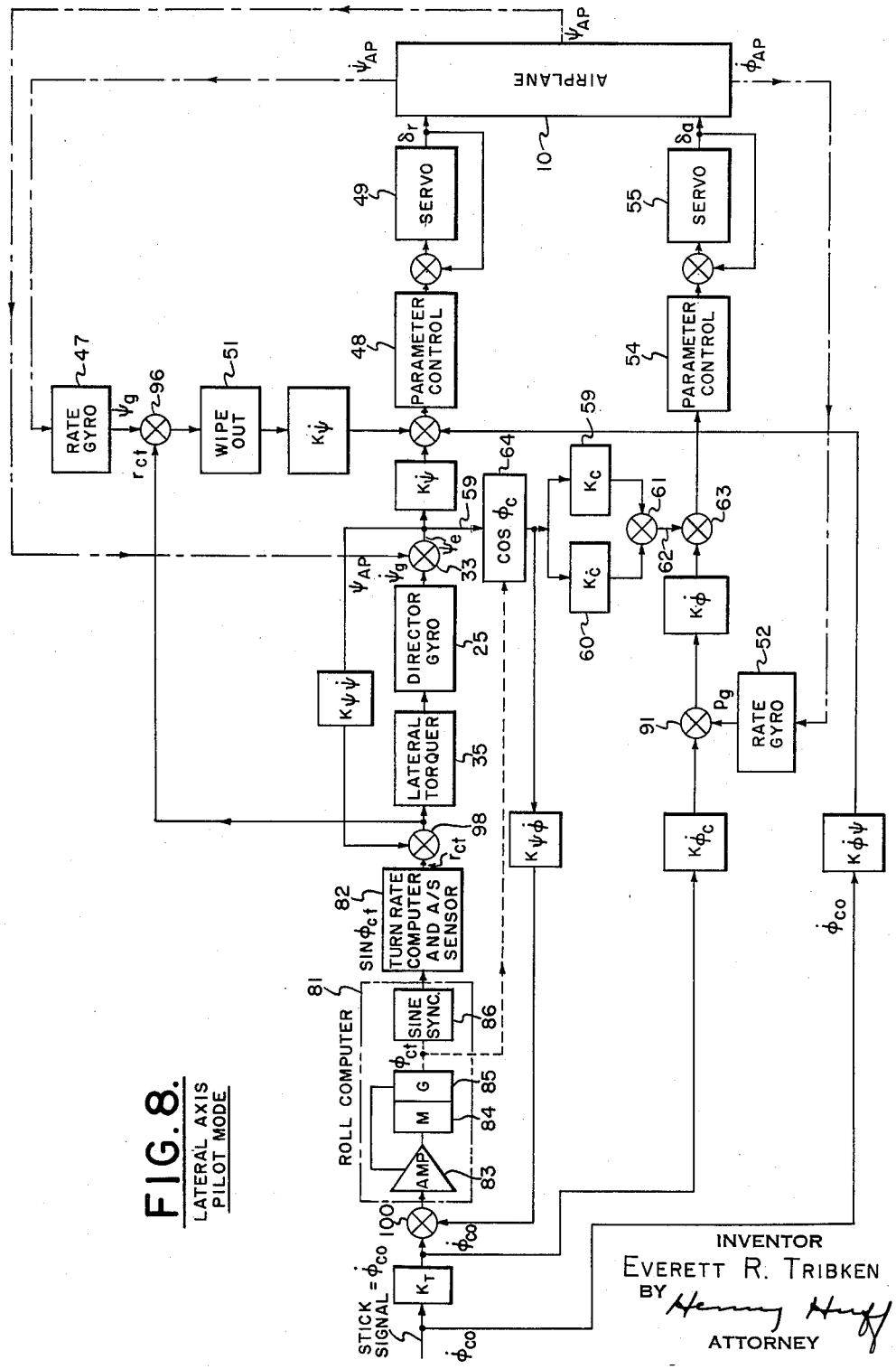

LATERAL AXIS
ROLL OUT MODE

INVENTOR
EVERETT R. TRIBKEN
BY Henry Huff
ATTORNEY

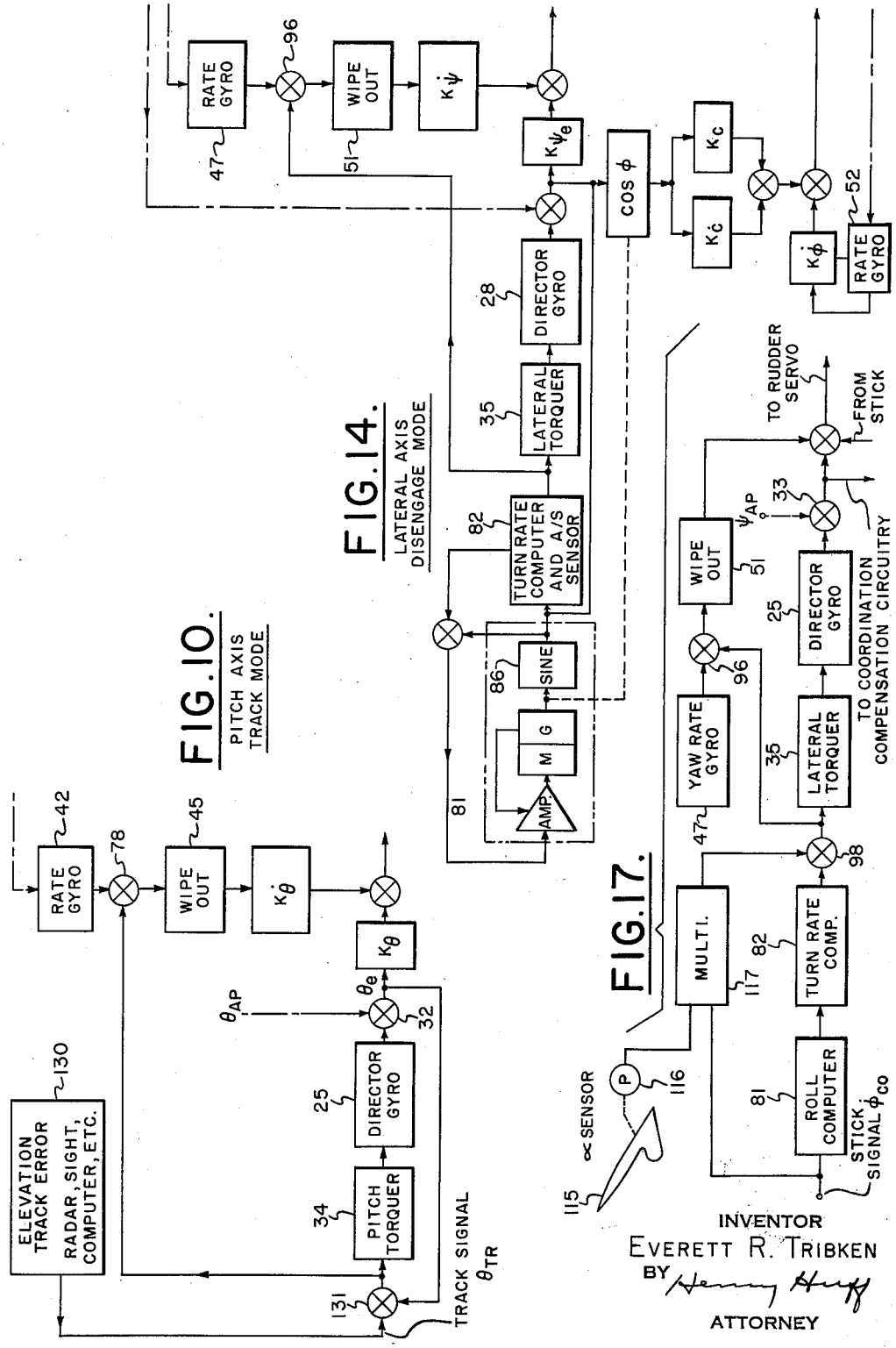

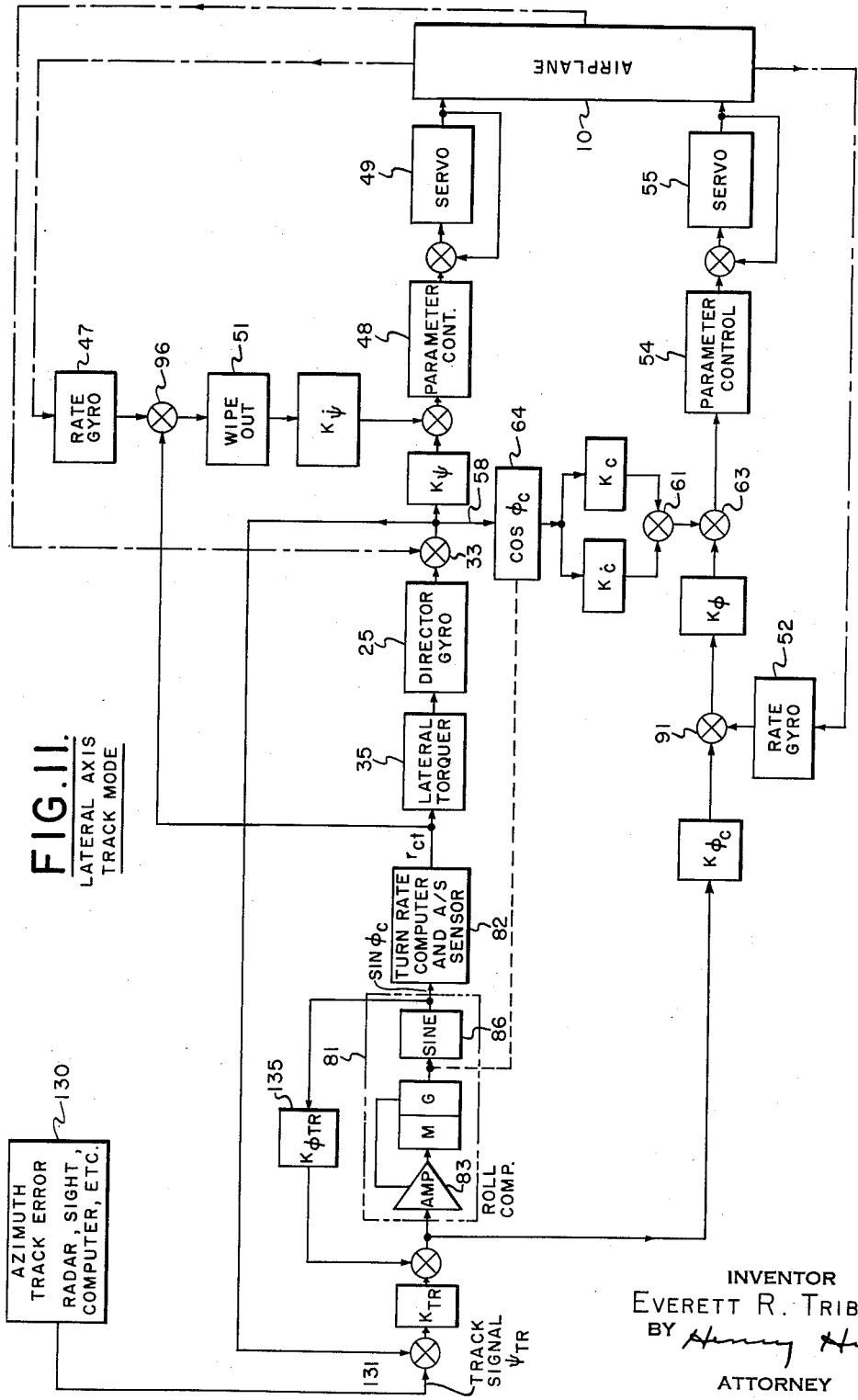

Oct. 16, 1962  E. R. TRIBKEN  3,058,697
AUTOMATIC PILOT
Filed March 25, 1959  12 Sheets-Sheet 11

NAVIGATION MODE

INVENTOR
EVERETT R. TRIBKEN
BY
ATTORNEY

NAVIGATION MODE

3,058,697
AUTOMATIC PILOT
Everett R. Tribken, Garden City, N.Y., assignor to Sperry Rand Corporation, a corporation of Delaware
Filed Mar. 25, 1959, Ser. No. 801,932
31 Claims. (Cl. 244—77)

The present invention relates generally to automatic flight control systems for aircraft and more particularly to an automatic pilot system in which craft earth-referenced attitude data, instead of being measured directly, is computed from measures of aircraft motions about its own primary axes and its motion in its substaining air mass. In general, such computation may be performed by either a digital or analog computer and the information provided thereby may be used to generate earth reference data for a flight control system using rate gyros, precessed gyros, angular accelerometers, etc., for short period stabilization control. By computing earth-based attitude information, displacement gyros measuring these quantities directly may be eliminated thereby eliminating their inherent disadvantages, such as acceleration effects, gimbal lock or tumbling with a resultant loss of reference, etc.

In other of its aspects, the present invention relates to an automatic pilot system for controlling the flight of aircraft of the fighter category having no restrictions upon the maneuvers commanded thereof while at the same time requiring continuous displacement and rate stabilization during such maneuvers.

The general principles of operation of the computing automatic pilot of the present invention lie in the fact that an airplane which is flying straight and level in its sustaining air mass and in the earth's gravity field must develop a lifting force to overcome the gravitational force and, therefore, if Coriolis acceleration and earth's curvature are neglected, any acceleration acting on the aircraft will result in a corresponding acceleration or angular rate of the aircraft itself, and by measuring such accelerations and angular rates and other data obtained in aircraft coordinates, it is possible to compute from these data what the aircraft's attitude is relative to the earth. Such other data required for the computation of earth-referenced craft attitude is air mass data, such as, rate of climb, air speed, and angle of attack. The function of the computer is, in effect, the solution of predetermined equations of motion of the aircraft and with the continued perfection of computing devices, either analog or digital, such a computing automatic pilot is both feasible and practical and results in a relatively simple, lightweight, highly accurate, and compact system.

The basic inputs to such a computer are rate commands which are to be performed by the aircraft and may be inserted either by a human pilot or by any other system such as, for example, a navigation or five control system. Furthermore, these commands may be inserted into the computer as earth-referenced or aircraft-referenced commands. The primary data for the computer as measured by suitable sensors in the aircraft and which are measured in aircraft axes are inserted as other inputs to the computer. These data are combined and correlated in the computer in such a manner as to determine the correct aircraft motions about its primary axis to produce a coordinated maneuver of the aircraft for the commanded rates. Therefore, if an error exists between the actual aircraft rate and the computed aircraft rate, this error can be used to actuate control surface servo systems for reducing such errors toward zero. As a byproduct of such computer operation, outputs therefrom are available which are indicative of the attitude of the aircraft with respect to the earth and this attitude information may be displayed to the pilot and/or to slave a vertical gyro if desired.

In the other aspects of the present invention, the unlimited maneuvering capabilities of the automatic pilot system results from the use of a movable gyroscopic space axis reference system, such as for example, that provided by a director or "x-axis" gyroscope. A director-type gyro is esssentially a normally free gyroscope and is so constructed and arranged in the aircraft that its spin axis is normally substantially aligned with or made parallel with the fore-and-aft axis of the aircraft and maneuvers are performed by precessing the gyro spin axis to achieve the desired orientation of the gyro spin axis in inertial space and causing the aircraft to be slaved to this spin axis. Therefore, gyro errors, that is, misalignment or angular error in pitch and yaw between the craft x-axis and the gyro spin axis, control aircraft pitch through the elevators and control yaw through the combined operation of the rudder and ailerons.

Since the aircraft x-axis is always maintained in close alignment with the gyro spin axis, gimbal lock and gimbal errors are eliminated—hence unlimited maneuverability. Furthermore, the use of this gyro configuration provides a displacement reference for the aircraft resulting in tight displacement control or what may be referred to as a tight x-axis "pointing." When combined with rate references such as rate gyros (or derivatives of the director gyro errors), this gyro configuration provides a movable displacement control system having all the advantages of a pure rate reference system without its disadvantages. For example, as in a rate reference system, as opposed to a fixed displacement reference system, the present gyro configuration eliminates cross control of gyro errors between rudder and elevators and eliminates bank and yaw angle discontinuities at near 90° of pitch, thus permitting direct craft control at 90° of pitch attitude. On the other hand, the disadvantages of a rate reference system are not present in the movable displacement reference system of the present invention. For example, since the aircraft is a poor integrator, a pure rate reference system requires long period displacement references such as a compass and vertical gyro so that the problems of the fixed displacement reference system are still present. On the other hand, if the long period control is loose, displacement control is not achieved and its pointing characteristics are poor, i.e., it is a poor stable platform such as is required for effective bombing and/or gunnery and rocketry in military aircraft. The movable displacement system of the present invention requires long period references only during its navigation or flight path control modes while in all other modes the craft is continually displacement stabilized about a flight path defined only by the drift rate of the director gyro which, with careful gyro design, can be very low. Thus, the autopilot can be used for pilot relief and even for navigation over moderate distances without any long period displacement references.

In some respects the autopilot of the present invention relates to a system such as that disclosed in copending application Ser. No. 498,352, filed March 31, 1955, in the name of Malcolm J. Abzug, for Automatic Pilot for Aircraft, which application is assigned to the same assignee as the present application. This reference application discloses a director-gyro-controlled automatic pilot in which unlimited maneuvers, at least in some modes, is provided, and the automatic pilot of the present invention constitutes an improvement over the autopilot disclosed in this copending application.

In the automatic pilot of the present invention, maneuvers may be made about either airplane axes or earth axes. Generally, the aircraft is maneuvered about its own axes when under the direct control of the human pilot through control stick steering (signal pick-offs mounted directly on and responsive to movements of the pilot's control column) and also when the craft is being maneuvered automatically through an air-to-air fire control system such as by a fire control tracking radar. However, the aircraft is maneuvered about or referenced to earth axes when in a bombing mode or when direct navigational and/or flight path control sensors are used to supply input commands normally referenced to earth axes.

As above stated, the director gyro provides a movable displacement reference system for the automatic pilot thereby providing unlimited displacement stabilization about all craft axes for relatively long periods (within the drift rate of the director gyro). For short period rate stabilization, pitch, roll, and yaw rate gyros responsive to angular rates about these axes are employed. Associated with the pitch and yaw rate gyros are high-pass filters or wipe-out circuits which function to supply outputs from these gyros only upon changes in aircraft rates thereby preventing these gyros from supplying outputs during steady-state rates about the pitch and yaw axes.

The present automatic pilot provides a movable displacement reference system not only for the pitch and yaw axes but also for the roll axis. Since the director gyro spin axis is normally substantially parallel to the craft fore-and-aft or roll axis, the gyro cannot supply a direct measure of angular displacements about this axis. However, a movable roll displacement reference may be indirectly derived from measures of the amount and rates of movements of the reference system, or director gyro spin axis, in yaw. If there exists a rate of change of the angle between the spin axis of the director gyro in space and the craft fore-and-aft axis as measured in the craft's horizontal or $x$—$y$ plane, it means that there is a bank angle error since most aircraft will not aerodynamically assume a yawed condition of flight, i.e., it will not naturally make a flat turn. Also, the absolute angular displacement error may be considered the time integral of bank angle. Thus, the rate of change of yaw error as measured by the director gyro provides a roll displacement reference, while the spin axis absolute yaw error assures that the craft roll angle will go to zero in straight and level flight. Resolution of the gyro yaw error signal as a function of bank angle may be required to provide proper sensing at high bank angles.

As stated above, there is no vertical gyro in the present automatic pilot. Instead, the computer described above is employed to compute bank angle from commanded roll rate, actual, and/or computed craft rate of turn, and air speed data, while aircraft pitch attitude is computed from relative movement of the aircraft in its supporting air mass, i.e., barometric and air speed data.

In the following specification, specific illustrative embodiments of the computer portion of the automatic pilot are described and, following this, a specific embodiment of an autopilot incorporating many of these computing features as well as other stabilization features is set forth. In this latter embodiment, several modes of operation are illustrated and the various computing techniques employed for computing craft roll and pitch attitude depend upon which mode of operation is selected.

The latter of the automatic pilot embodiments of the present invention provides stabilized, coordinated flight of the aircraft under all normal flight modes as follows:

(1) Stabilization Mode
(2) Pilot Mode
(3) Roll Out Mode
(4) Automatic Track Mode
(5) Navigation Mode
(6) Disengage Mode A further mode of operation offered by the present autopilot is a Stability Augmentation Mode.

In the stabilization mode the aircraft is controlled about its pitch axis solely through the director gyro and the pitch rate gyro operating through the elevator control servo system, there being no command signals to alter the director gyro position or spatial orientation. Thus, the craft will be stabilized against angular pitch displacements of relatively long periods by the director gyro as well as against short period angular pitch disturbances by the pitch rate gyro. Likewise, the aircraft is controlled about its yaw and roll axes through the director gyro and the yaw and roll rate gyros operating through the rudder and aileron control servo systems. Displacement and rate stabilization about the yaw axis is provided by the director gyro and yaw rate gyro respectively, while displacement stabilization about the roll axis is provided by the angular error between the director gyro spin axis and the craft fore-and-aft axis in the craft $x$—$y$ plane and the rate of change of this error, and roll rate stabilization is provided by the roll rate gyro.

The pilot mode is initiated by the pilot moving his control stick or column thereby operating detent switches which establish circuits enabling stick force sensors to supply input command signals proportional to desired or commanded pitch and roll rates. These command signals operate through computers to alter the position of the director gyro spin axis in yaw and pitch and thereby the attitude of the aircraft. Upon the centering or neutralizing of the control column, the rate command signals are reduced to zero and the system reverts to its stabilization mode, stabilizing the craft at the attitude it has attained by virtue of the stick movement.

In pitch, the signal from the pilot's stick is proportional to a desired pitch rate and this signal is employed to precess the director gyro in pitch to thereby reorient the gyro spin axis. Upon removal of the pitch rate command, i.e., the stick is neutralized, the director gyro is no longer precessing and tends to maintain its position in space. Since the pitch rate gyro would normally oppose any rate of pitch of the aircraft, the pitch rate command signal is bucked against the rate gyro output thereby allowing the airplane to rotate to its new pitch attitude.

The pilot's lateral stick movement produces a signal proportional to the commanded roll rate and this signal is applied directly to the aileron control servos to thereby produce a roll rate of the craft through the ailerons. The roll rate command signal is simultaneously applied to the roll computer which operates as an integrator of the roll rate command thereby producing a commanded resultant bank angle. This computed bank angle signal is modified as a function of air speed to produce a turn rate command signal which is used to precess the director gyro about its yaw axis at a rate proportional to the bank angle commanded. Also, as in the pitch channel, the turn rate command is used to buck out any output from the yaw rate gyro which would otherwise oppose any yaw rate of the aircraft. If the actual turn rate of the aircraft is not the same as the precession rate of the director gyro, the actual bank angle is not correct and this error and its rate are employed to alter the bank angle until both the director gyro spin axis and the aircraft $x$-axis are precessing at the same rate.

If the aircraft is in a banked maneuver and it is desired to roll to level flight, the pilot may do so conveniently by merely pressing a roll out button, for example, a button on the control column, which action automatically puts the craft in the roll out mode of operation. In this mode the bank angle computer is caused to follow-up on its own output thereby tending to reduce its output to zero. Thus, the input to the roll computer is the roll rate command for the aircraft, which input is fed as a roll command to the aileron control system as before. Also, the output of the roll computer is modified by air speed to produce a turn rate command which is used to precess the director gyro in proportion to the diminishing bank angle. Again coordination of the roll out maneuver is provided by a signal dependent upon the error between the gyro spin axis and the craft's fore-and-aft axis, together with its rate of change, which signal is applied to the aileron servo system.

In the track mode of operation, the airplane is controlled to reduce the difference between the directional orientation of the fore-and-aft axis and the direction defined by a fire control computer. The latter direction may be defined, for example, by a stabilized radar tracking system and fire control computer. As pointed out in the above-mentioned Abzug application, the advantages of a director-gyro system are most predominant in the tracking mode of operation. In this mode the tracking radar supplies elevation and azimuth errors in airplane axes and the difference in the angular orientation of the director gyro spin axis and the track defined by the orientation of the radar beam are compared and any difference therebetween is supplied as pitch and yaw rate commands to the director gyro torquers in a sense to reduce the difference toward zero. Thus, the autopilot system is not gust sensitive because any external disturbances in craft yaw and pitch due to a gust will not produce a gyro precession signal. Furthermore, the axis about which the aircraft is stabilized is the fore-and-aft axis which is normally coincident with the gun or rocket or missile launching line (which is the case in most fighter aircraft).

In the pitch axis, the track signal is compared with the orientation of the director gyro spin axis with respect to the craft fore-and-aft axis and any resultant signal is employed to precess the director gyro in a direction to reduce the error to zero, the aircraft following the director gyro spin axis as in the pilot's pitch command mode.

In the azimuth axis, the azimuth tracking error is compared to aircraft yaw error with respect to the gyro spin axis in the same manner as in the pitch case. However, in the track mode, the output of the roll computer is fed back to its input where it is compared with the tracking and director gyro difference, the resultant signal representing the bank angle command signal to the roll computer. This resultant signal is also supplied to the aileron servo system to provide a bank rate command, while the true air speed computer responsive to the bank angle command provides the coordinated precession rate for the director gyro in yaw. The track system produces a reduction in azimuthal tracking errors at a rate proportional to the magnitude of the error.

In the navigation mode of operation, all command inputs to the director gyro are references to earth axes since these comands are derived from measures of earth-based quantities such as magnetic heading and barometric altitude. These earth-based quantities serve as the very long term references for the automatic pilot. Heading displacement commands are provided by control stick steering or by a suitable magnetic heading selector which provides a signal proportional, within limits, to the angular difference between an existing magnetic heading and a desired magnetic heading. Since this angle is measured in earth coordinates, the input command signal is supplied to the director gyro through a resolver positioned in accordance with bank angle to compute the proper proportions required to precess the gyro about both the yaw and pitch aircraft axes. At the same time, the signal to the yaw axis of the director gyro is modified as a function of true air speed and is employed to compute the bank angle required and simultaneously to produce a roll of the aircraft through the aileron channel, coordination being provided as in the other modes of operation of the system. In this manner, the system responds to heading errors with a turn rate in earth coordinates proportional to such error.

In the pitch axis, a rate of climb computer serves as a long term pitch reference, zero rate of climb indicating that a level flight path is being flown. Pitch commands may be put in through control stick steering or by selecting a desired flight path angle. The latter command signal, modified by true air speed, is representative of a rate of change of altitude and is used to drive the rate of climb computer, the output being compared to measured altitude. The resultant signal is compared with the director gyro output to provide long term pitch displacement control. The same signal is applied through a resolver, positioned by the bank angle computer, the proper output thereof being supplied to the director gyro pitch axis torquer to thereby provide integral control. The system will follow the flight path command by continuously cancelling the altitude error. When a zero flight path angle is commanded, the rate of climb computer is locked and the craft is controlled in the same manner to reduce any altitude error from the altitude sensor.

Prior to engagement of the automatic pilot servo systems with their control surfaces, the system is in the disengaged mode, in which case the autopilot serves or is caused to follow the movements of the control surfaces in response to direct manual commands thereto. In the pitch axis, the director gyro follows up on any error between the orientation of its spin axis and the craft fore-and-aft axis resulting in a continued alignment of the gyro with airplane attitude. Thus, on engagement of the autopilot servos with the control surfaces, the airplane will be maintained in whatever attitude it held at that instant. In the lateral axis the director gyro is likewise placed in follow-up on its own output, certain modifications being made to the follow-up signal applied to the director gyro yaw torquer. If the airplane happens to be in a coordinated maneuver at a given bank angle and turn rate (pitch angle assumed small), the bank angle of the craft is computed from a measure of the aircraft turn rate (the director gyro follow-up signal) and air speed. Thus, the roll computer is caused to follow-up on a signal proportional to turn rate and true air speed and a continuous measure of bank angle is available.

In the stability augmentation mode, the displacement signals from the director gyro are cut out by switching and hence only the angular rate gyro signals get through to the surface servomotors. In this mode the craft is under direct control by the human pilot operating the surfaces through multiple input-type servo systems.

One of the primary objects of the automatic pilot of the present invention is to provide computing apparatus which is adapted continuously to compute craft earth-referenced attitude from measures of craft movements relative to gravity vertical and to the aircraft's sustaining air mass.

Another object of the present invention is to provide a computing, full-freedom automatic pilot for aircraft wherein both roll and pitch attitude are computed thereby eliminating the requirement of a vertical gyro and its inherent limitations as a full-freedom roll and pitch reference device.

A still further object of the present invention is to provide an automatic pilot for stabilizing both short and long period disturbances acting on the aircraft, such stabilization being continuously provided throughout 360° maneuvers of the aircraft about all aircraft axes and including the computation of aircraft attitude rather than a direct measure thereof as by a vertical gyro.

Another of the primary objects of the present invention is to provide an automatic flight control system for aircraft which is an improvement over that disclosed in the above-identified Abzug application.

Another object of the present invention is to provide a movable displacement reference system in pitch and yaw, thereby permitting unlimited maneuverability about these axes, together with angular rate references, such as rate gyros, sensitive to angular rates about these axes for short period stabilization, the latter operating through high-pass or wipe-out circuits for suppressing steady-state turn rates of the craft about these axes.

A further object of the present invention is to provide a movable displacement reference system for aircraft autopilots wherein the pitch and yaw angular displacements are measured directly by gyroscopic means defining an axis in space normally parallel to the craft's x-axis, such as by a director or x-axis gyro and wherein roll displacement is derived as a function of the yaw angular displacement between said space axis and said craft fore-and-aft axis.

Other objects and features of the automatic pilot of the present invention will become apparent as a description of a preferred embodiment thereof proceeds, reference being made to the accompanying drawings wherein:

FIG. 3 is a schematic diagram of another embodiment of an automatic pilot including a computer for providing a measure of craft roll and pitch attitude as a function of the precession rate of a gyro-defined fore-and-aft reference axis to which the aircraft fore-and-aft axis is accurately slaved, together with measures of craft air speed, gravity, altitude, and angle of attack;

FIGS. 4 through 17 are schematic and block diagrams of a preferred embodiment of an automatic pilot constructed in accordance with the teachings of the present invention and incorporating the computation techniques of FIGS. 1–4 inclusive; and wherein:

FIG. 4 is a schematic block diagram illustrating how the various modes of operation of the automatic pilot may be selected and rendered effective in controlling the aircraft;

Figure 16:
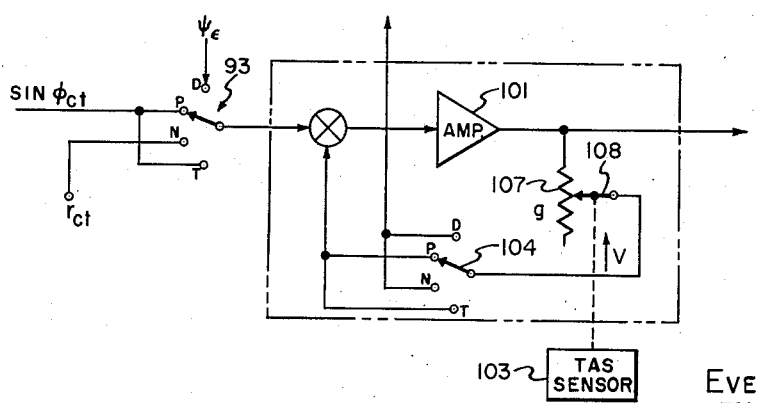
Figure 5:
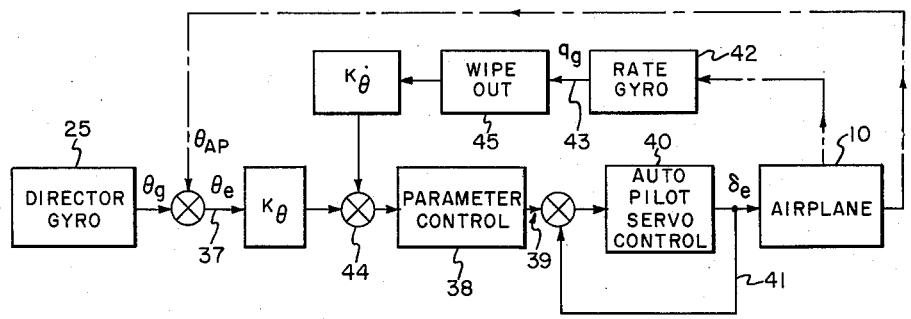
Figure 6:
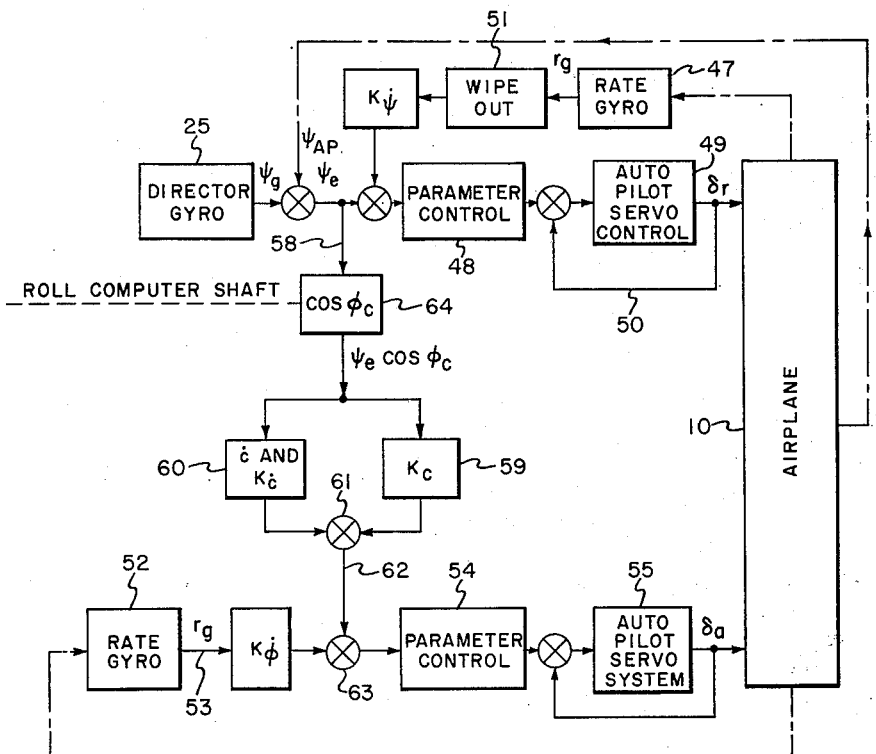
Figure 7:
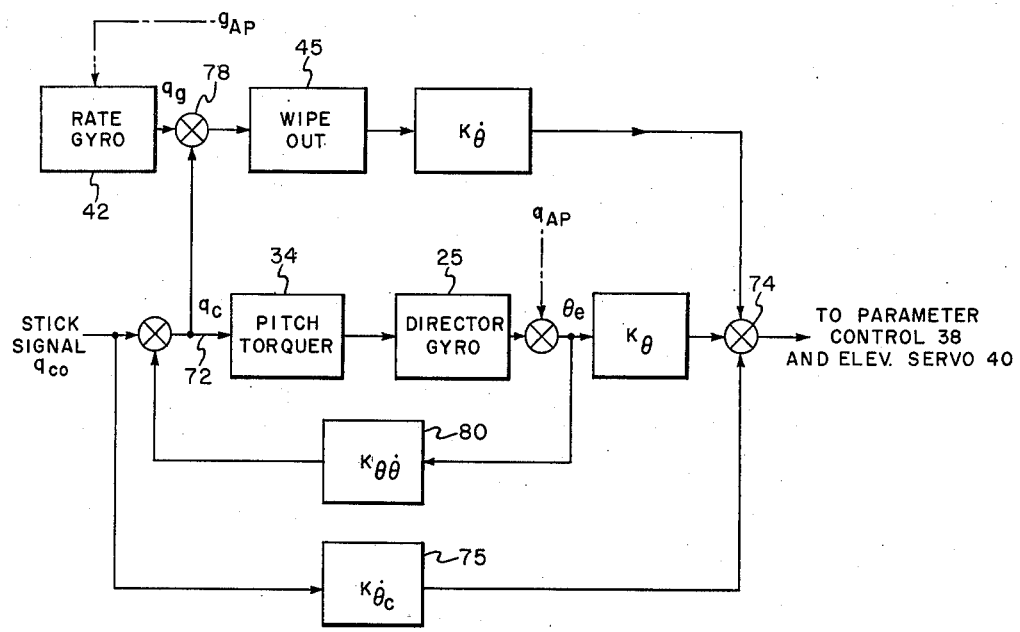
Figure 13:
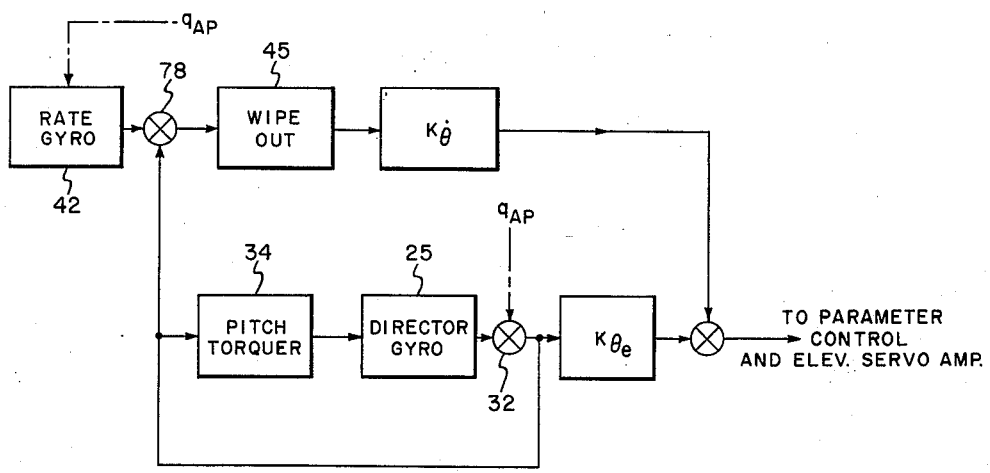
Figure 9:
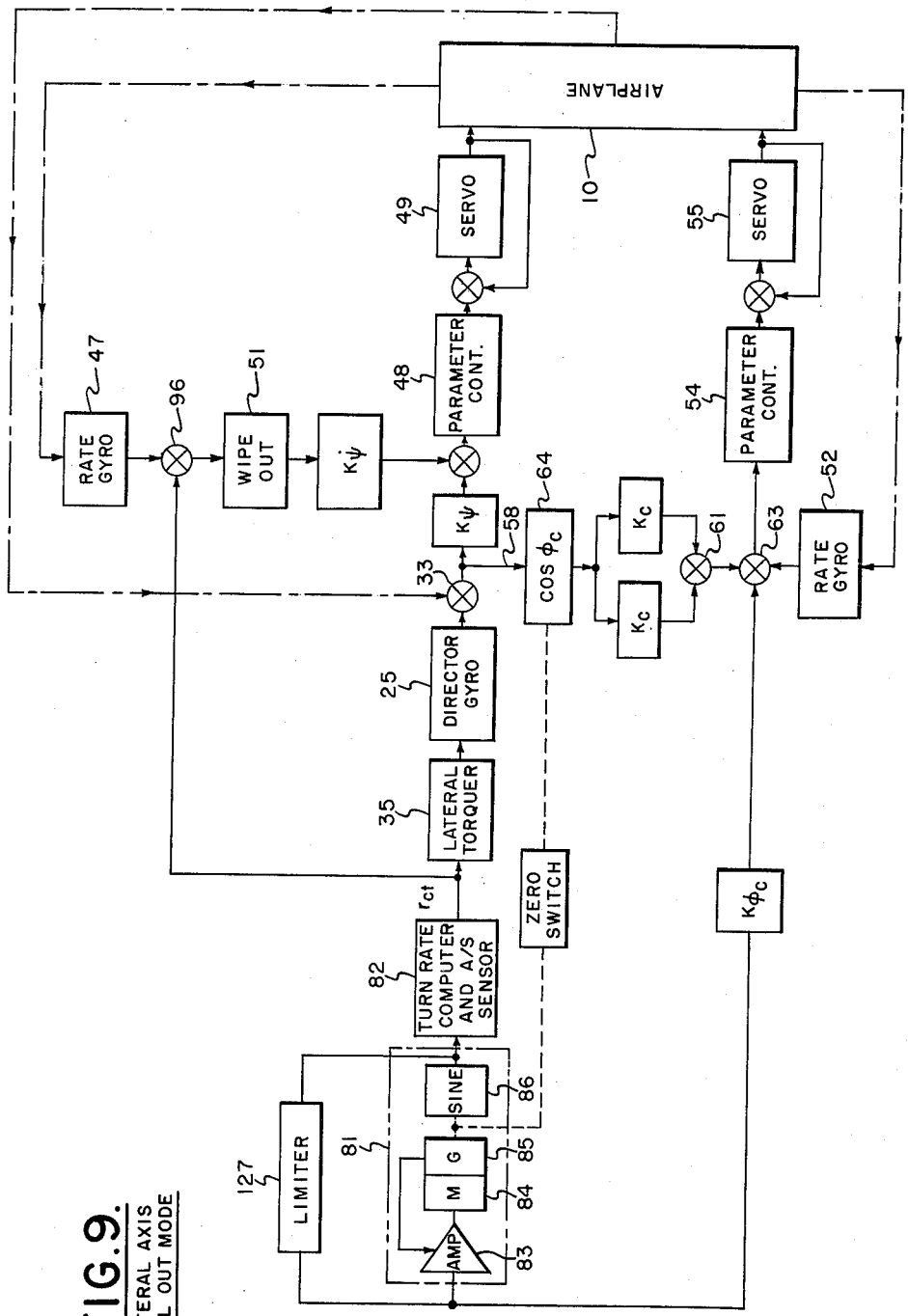
Figure 12A:
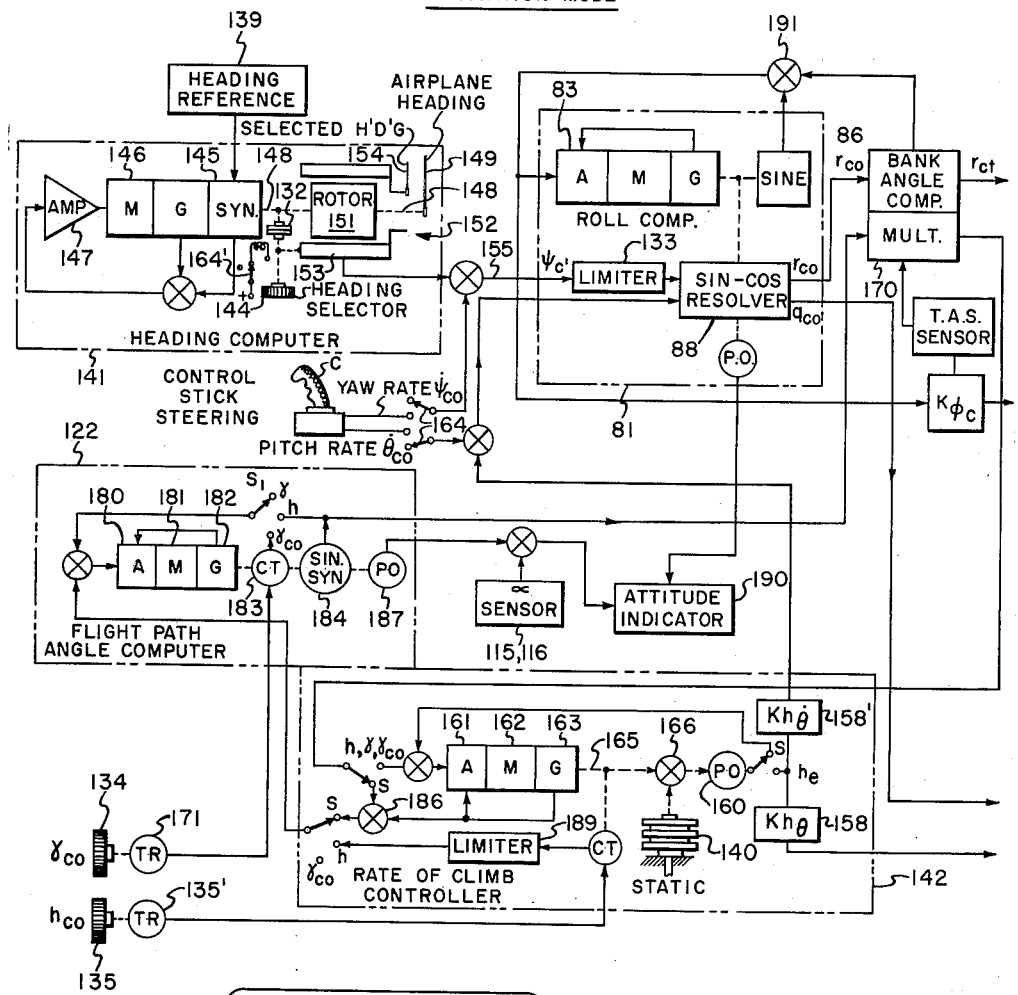
Figure 15:
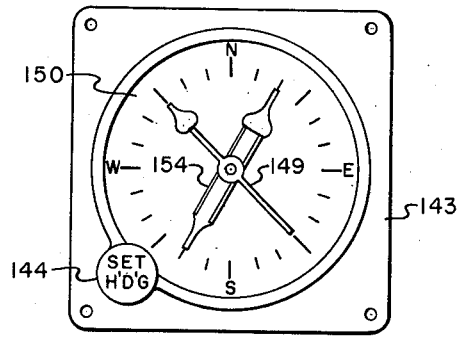
Figure 12B:
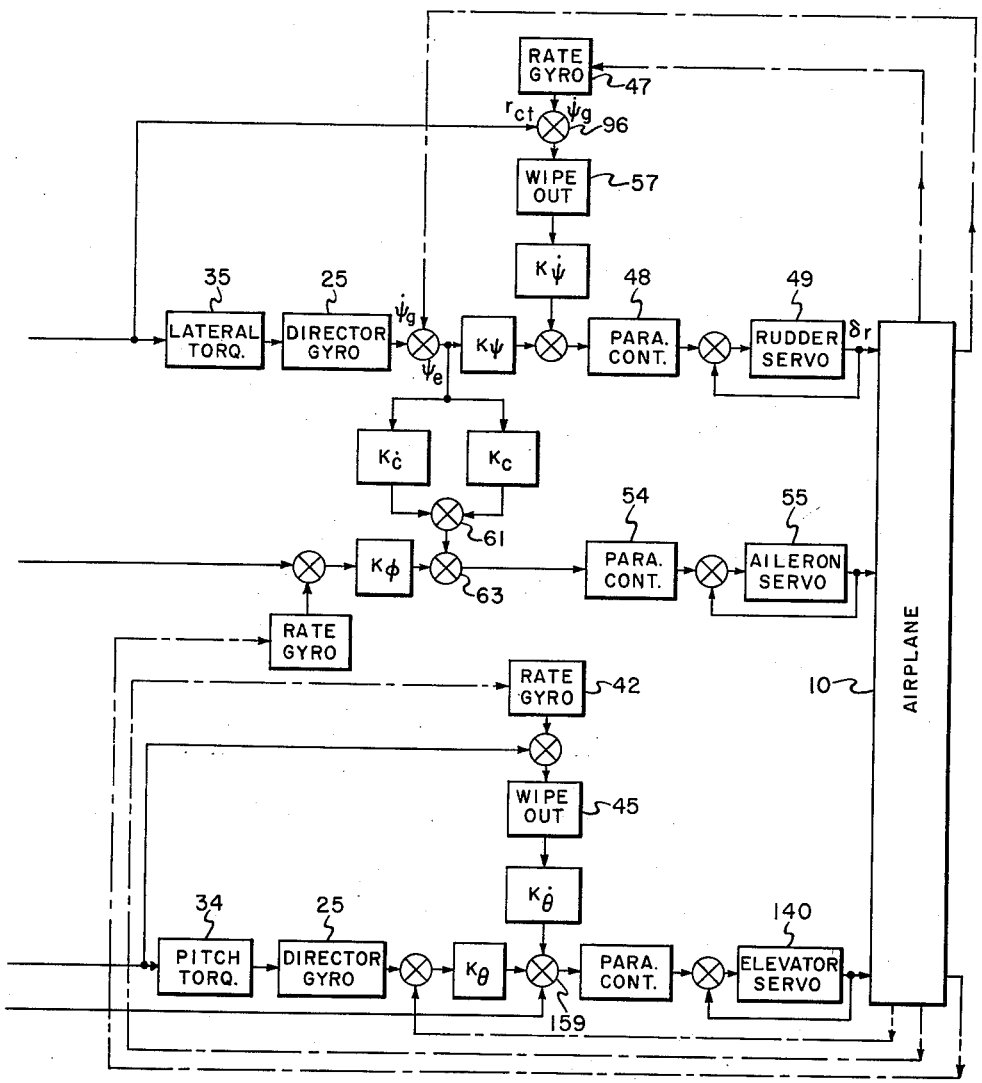

FIGS. 5 and 6, respectively, are block diagrams of the pitch and lateral axis control systems, arranged for operation in the stabilization mode;

FIGS. 7 and 8, respectively, are block diagrams of the pitch and lateral axis control systems, arranged for operation in the pilot mode;

FIG. 9 is a block diagram of the lateral axis control system, arranged for operation in the roll out mode of operation;

FIGS. 10 and 11, respectively, are block diagrams of the pitch and lateral axis systems, arranged for operation in the automatic track mode;

FIGS. 12a and 12b are block diagrams of the pitch and lateral axis channels when the autopilot is arranged for operation in the navigation mode;

FIGS. 13 and 14, respectively, are block diagrams of the pitch and lateral axis control channels, arranged for operation in the disengage mode;

FIG. 15 is a front elevation view of a heading indicator suitable for use in the present invention;

FIG. 16 is a schematic illustration of an air speed computer suitable for use in the present invention; and FIG. 17 is a block diagram of a modification of a portion of the automatic pilot of the pesent invention.

Figure 1:
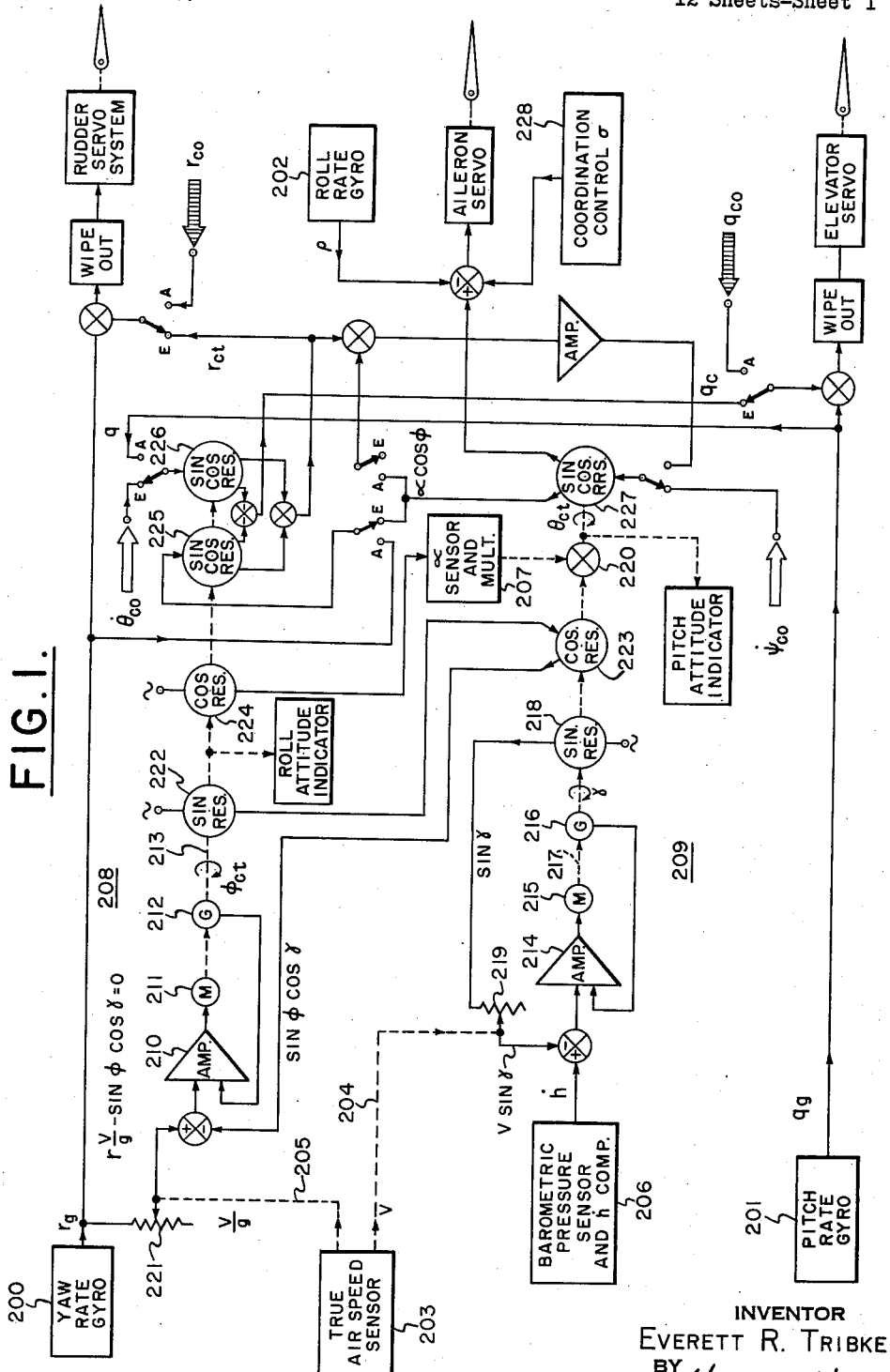
FIG. 1 is a schematic diagram of an embodiment of an aircraft automatic pilot having an attitude computer for providing measures of craft roll and pitch attitude as a function of measured craft angular rates about its own primary axes, gravity, air speed, altitude, and angle of attack.

Referring now to FIG. 1, there is schematically illustrated a computing automatic pilot constructed in accordance with the teachings of the present invention. It is immediately apparent that there is no vertical gyro and yet measures of roll and pitch attitude are available and may be indicated to the pilot. Also, it will be seen that the roll and pitch attitude measures are computed from input quantities or signals which are measures of aircraft reference data such as aircraft axes turn rates, altitude rate, air speed, and angle of attack, together with desired maneuver command data and, furthermore, that such command data may be inserted as desired maneuvers with respect to either aircraft or earth axes whereby the system may be adaptable to inputs from a pilot's stick controller or interaircraft fire control or navigation systems or from earth-based navigation systems or instruments such as a bombing system, or a magnetic compass, or other ground track references such as radio beams, etc.

The computing automatic pilot as illustrated in FIG. 1 comprises generally sensor devices for producing signals in accordance with craft rates of turn about its primary axes, true air speed, altitude rate, and angle of attack. Thus, there is provided yaw, pitch, and roll rate gyros 200, 201, and 202 of conventional form, each adapted to provide signals proportional respectively to yaw ($r$), pitch ($q$), and roll ($p$) rates respectively of the aircraft as by means of suitable, preferably linear, pick-off devices associated therewith. True air speed sensor 203 provides two outputs 204 and 205. These outputs are illustrated as being mechanical outputs having displacements proportional respectively to true air speed V and true air speed V divided by gravity constant $g$. This true air speed sensor 203 may also be of conventional form and the quantity $$\frac{V}{g}$$

derived by means of a conventional divider network. A barometric sensor 206 provides an output proportional to the rate of change of altitude of the aircraft $\dot{h}$ and may be of the type illustrated in U.S. Patent No. 2,729,780, assigned to the same assignee as the present invention. The angle of attack sensor 207 provides an output proportional to the angle of attack of the aircraft and may be of any suitable type providing an output proportional to the angle of attack $\alpha$ of the aircraft. The angle of attack sensor 207 may have associated therewith a suitable follow-up device for providing a mechanical output or shaft rotation proportional to the angle of attack of the aircraft.

The two basic computer components of the automatic pilot of FIG. 1 are a bank or roll angle computer 208 and the pitch angle computer 209. The roll angle computer 208 comprises a first instrument servo including an amplifier 210, motor 211, generator 212, and suitable function generators and resolvers operated by the motor output shaft 213. Similarly, the pitch angle computer 209 comprises a second instrument servo including amplifier 214, motor 215, generator 216, and similar function generators and resolvers positioned by the motor shaft 217. The roll angle computer 208 provides an output proportional to the computed roll angle of the aircraft $\phi_{ct}$ as a function of craft rate of yaw, air speed, and craft pitch angle, while the pitch angle computer 209 provides a measure of craft pitch angle as a function of altitude rate, air speed, angle of attack, and roll angle.

Considering first the operation of the pitch angle computer 209, the barometric pressure sensor and altitude rate computer 206 supplies an output in accordance with the rate of change of altitude of the aircraft $\dot{h}$. This signal is applied as one input to the pitch angle computer amplifier 214. On the output shaft 217 of computer motor 215 is a sine resolver 218 which provides in its output a signal in accordance with the sine of the angular rotation of the shaft 217. This signal is multiplied, as by means of potentiometer multiplier 219, by the true air speed V of the aircraft. The resulting product is fed back to the input of the computer where it is compared with the altitude rate signal. Thus, it can be seen that initially the pitch angle computer 209 solves for the flight path angle $\gamma_{ct}$ of the aircraft in accordance with the following equation:

$$\gamma = \sin^{-1}\frac{\dot{h}}{V} \tag{1}$$

(A glossary of symbols used in the present specification appears at the end thereof.) Since flight path angle $\gamma$ may be related to craft pitch angle and angle of attack in accordance with:

$$\gamma = \theta - \alpha \tag{2}$$

pitch angle $\theta_{ct}$ may be computed by adding angle of attack $\alpha$ to flight path angle $\gamma$. This is accomplished in the pitch angle computer 209 by means of a summing circuit or mechanical differential 220 which receives as one input the computer measure of flight path angle $\gamma_{ct}$ and as the other input a measure in accordance with the angle of attack $\alpha$ of the aircraft. It will be appreciated that in a rigorous solution for pitch angle, the angle of attack signal must be modified in accordance with bank angle and this is accomplished in FIG. 1 by multiplying the angle of attack by the cosine of the bank angle, the latter being computed in a manner to be described below. Thus, the output of the differential device 220 is directly proportional to the pitch attitude of the craft. In other words, if the craft is climbing at the rate $\dot{h}$ and has an angle of attack $\alpha$ and bank angle $\phi$, then it must have a pitch attitude $\theta$ relative to the earth.

The roll angle $\phi$ of the craft is computed through the solution of the following equation:

$$r\frac{V}{g} = \sin\phi \cos\gamma \qquad (3)$$

The operation is as follows. Craft yaw rate $r_g$ as sensed by yaw rate gyro 200 is applied across multiplier potentiometer 221 where it is multiplied by the $$\frac{V}{g}$$

output 205 of true air speed sensor 203 to provide a resultant signal in accordance with $$r\frac{V}{g}$$

This signal is applied as one input to the roll computer amplifier 210 whose motor 211 is driven initially in accordance therewith. However, on the output shaft 213 of the roll computer is a sine resolve 222 which provides in its output a signal in accordance with the sine of the rotation of shaft 213. This signal is modified or multiplied by a signal proportional to the cosine of the flight path angle $\gamma$ as by a cosine resolver 223 mounted on the shaft 217 of pitch angle computer 209. The resultant product is subtracted from the initial input to the roll angle computer amplifier 210 whereby the output shaft 213 will come to rest at a point when the input to the amplifier 210 is zero, i.e., when $$r\frac{V}{g} = \sin\phi \cos\gamma$$

or at an angular position $$\phi = \sin^{-1}\frac{Vr}{g\cos\gamma}$$

Thus, the angular position of output shaft 213 of roll computer 208 is a measure of the computed bank angle $\phi_{ct}$ of the craft. In other words, if the craft has a pitch attitude such that its flight path angle is $\gamma$ and the craft is turning at the rate measured by yaw rate gyro 200 and its air speed V is that measured by the true air speed sensor 203, then the craft must be banked at the bank angle $\phi$. Also, on the output shaft 213 of the roll angle computer 208 is a cosine resolver 224 which provides the cosine $\phi$ signal for use in the computation of pitch angle through the angle of attack sensor and multiplier 207.

As above stated, command inputs to the computing automatic pilot illustrated in FIG. 1 may be inserted in either aircraft coordinates or in earth coordinates, the former being indicated by the labeled open arrows and the latter by labeled cross-hatched arrows. If rate commands are inserted in earth coordinates, resolution of these into aircraft coordinate rate commands must be performed and conversely, if the commands are inserted in aircraft coordinates, the coordinated roll rate must be computed. Since in either case the above resolution is a function of craft roll and pitch attitude, resolvers 225, 226 are provided on the output of the roll angle computer 208 and resolver 227 is provided on the output shaft of the pitch angle computer 209. Also, the switching of the signals between these resolvers in accordance with the type of input commands is provided, each switch having the position E representing earth coordinate commands and position A representing aircraft coordinate commands. As clearly shown in FIG. 1, commands in aircraft axes are fed directly into the aircraft rudder and elevator servo system and the coordinated roll rate is computed from resulting aircraft rates about roll and pitch axes. On the other hand, if earth axes commands are inserted, the corresponding aircraft axis yaw, roll, and pitch commands are computed and inserted into the aileron, rudder, and elevator servo systems.

Figure 2:
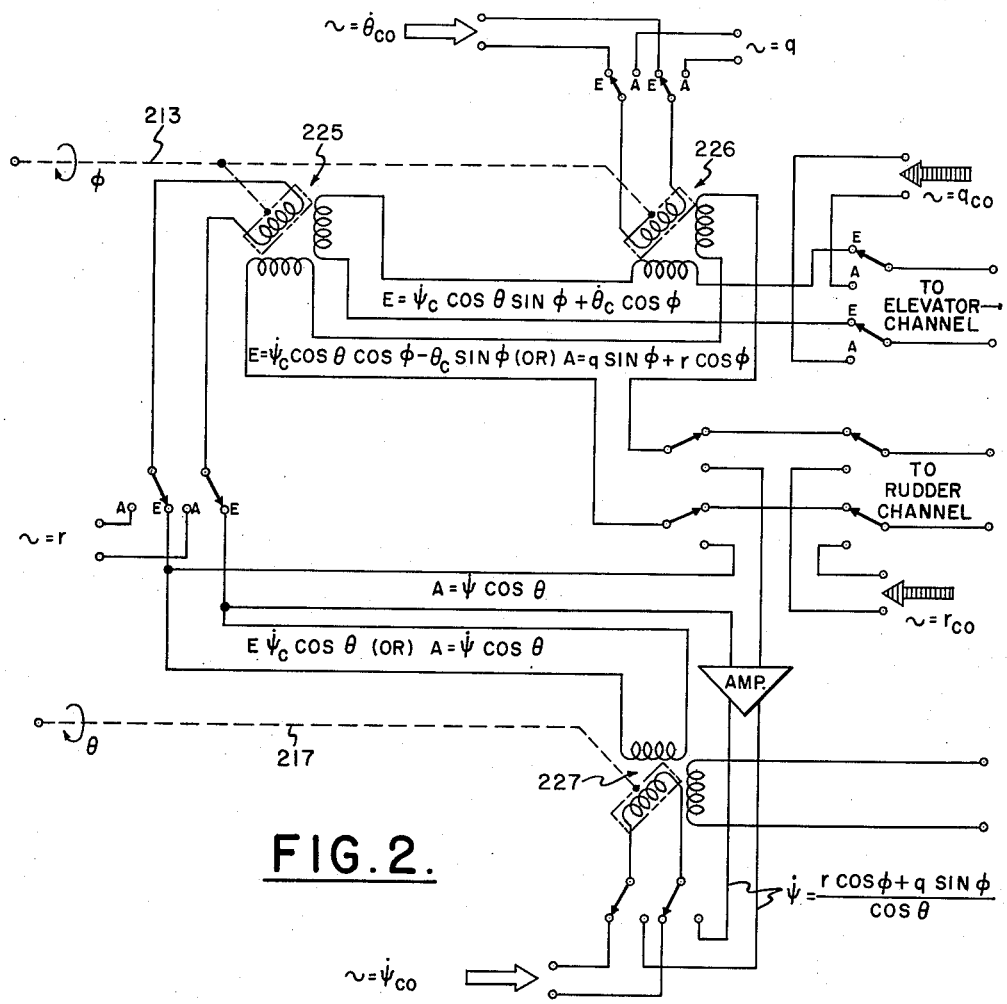
FIG. 2 is a schematic diagram of the resolver interconnections used in the autopilot of FIG. 1.

The manner in which the above resolution is carried out is shown in detail in FIG. 2. Consider first the resolution of earth axis yaw and pitch rate command signals into aircraft axis rate command signals. The equations required to be solved to accomplish such resolution are as follows:

$$r_c = \dot{\psi}_c \cos\theta \cos\phi - \dot{\theta}_c \sin\phi \qquad (4)$$
$$q_c = \dot{\psi}_c \cos\theta \sin\phi + \dot{\theta}_c \cos\phi \qquad (5)$$
$$p_{cc} = \dot{\psi} \sin\theta \qquad (6)$$

Secondly, the equations necessary to be solved for resolving yaw and pitch rate commands in aircraft axes into the coordinated roll rate command are as follows:

$$\dot{\psi} = \frac{q \sin\phi + r \cos\phi}{\cos\theta} \qquad (7)$$
$$p_c = \dot{\psi} \sin\theta \qquad (8)$$

The electromechanical or analog solution of these equations by resolvers 225, 226, and 227 and attitude references $\phi$ and $\theta$ is clearly indicated in FIG. 2. The mathematical computations are specified by the legends applied to the drawings and the required electrical interconnections between these resolvers is so clearly indicated that a detailed description of the flow of signals which accomplish this solution is deemed unnecessary.

From the foregoing, it is evident that there is provided a computing automatic pilot wherein both pitch and roll attitudes of the aircraft with respect to the earth are computed as a function of the yaw rate response of the aircraft, its air speed, altitude rate, and angle of attack. Such computation is based on the assumption that coordinated flight of the aircraft is achieved. If the computations performed are perfect, the aircraft will at all times perform coordinated maneuvers, without any restriction caused by acceleration effects, gyro tumbling or gimbal lock normally associated with systems using a vertical gyro measuring craft roll and pitch attitudes directly. However, if there are errors in the computations performed, these errors will be evidenced by a miscoordination of the maneuvers. Since means are available for detecting a miscoordination of maneuvers of an aircraft as, for example, by a lateral pendulum, these errors may be compensated. As shown in FIG. 1, if there is a miscomputation of bank angle, this miscomputation will show up as bank angle error. For detecting this bank angle error, i.e., a miscoordination, a lateral accelerometer or coordination pendulum 228 is provided. The signal produced thereby will be applied directly to the aileron servo system to correct the bank angle until coordinated flight is achieved and by such correction the aircraft actual bank angle will be adjusted to the bank angle computed by the bank computer 208 so that this computed bank angle is in fact the measure of the actual bank angle of the aircraft.

In FIG. 3, there is disclosed another embodiment of a computing automatic pilot constructed in accordance with the teachings of the present invention. The basic difference between the autopilot of FIG. 3 and that of FIG. 2 is in the form of the data input supplied to the roll and pitch attitude computer. Instead of actually measuring aircraft rates of turn and using these measures for the computation of roll and pitch attitude, a gyroscopic device which defines a reference axis in space is provided and craft yaw and pitch rate command signals are employed to precess this gyro-defined reference axis in space. One assumption is made, i.e., that the aircraft fore-and-aft axis is accurately slaved to the gyro-defined reference axis and that therefore the aircraft angular rates about these axes are the same as the precession rates of the reference axis produced by the command signal. (In FIGS. 4 through 17 to be described below, there is illustrated an automatic pilot system wherein the aircraft's fore-and-aft axis is slaved to the spin axis of a director-type gyro. As will be hereinafter more fully described, the gyro configuration illustrated in FIG. 3 has an important advantage in the fact that it provides a displacement reference for the aircraft, since in the absence of precessing torques or command signals, the gyro tends to hold its position or orientation in space.)

In FIG. 3, the computation of flight path angle and the resultant computation of pitch attitude therefrom and the computation of roll attitude is essentially the same as in FIG. 1, and the same reference characters used in FIG. 2 are used to designate the corresponding components of FIG. 3. An example of a gyro adapted to define a space reference axis capable of being precessed to any desired orientation in space is a so-called director gyro which is schematically illustrated at 25. This gyro will be described more in detail hereinbelow with respect to FIGS. 5–14 and for the purpose of the present embodiment it need only be said that the gyro is essentially a three-degree-of-freedom gyro so mounted in the aircraft that a spin axis normally is substantially parallel to the craft fore-and-aft or $x$-axis. Also, the gyro is provided with both elevation and azimuth torquers 34, 35 for precessing the spin axis with respect to the aircraft. Also, the gyro outputs may be supplied by elevation and azimuth signal pick-offs 32, 33 for supplying outputs to the rudder and aileron servomotors in accordance with any deviations between the angular orientation of the gyro spin axis and the orientation of the craft $x$-axis.

Since the aircraft angular rates in yaw and pitch may be made to substantially coincide with the angular rate of the spin axis of the director gyro 25, any precessional input to the elevation and azimuth torquers thereof will represent a rate of turn of the aircraft in azimuth and elevation. Hence, in a system wherein pitch and yaw command inputs are in terms of aircraft axes, as by means of a manual stick controller 233 for example, these pitch rate command and yaw rate command signals may be applied directly to the elevation and azimuth torquers of the director gyro 25 which produces a corresponding yaw rate and pitch rate of the aircraft. With the assumption that craft rates are the same as command rates through the director gyro, the yaw rate command $r_{co}$ instead of actual craft yaw rate is applied to the input of the roll computer 208 so that the resultant shaft rotation of the computer 208 is proportional to the aircraft bank angle based upon commanded yaw rate. The operation of the pitch attitude computer 209 is identical to that illustrated in FIG. 1. The equations used in the solution of bank angle and pitch angle are the same as in FIG. 1. The computation of the coordinated roll rate for the yaw and pitch rate commands in aircraft axes is also the same as in FIG. 2, except that the rate terms used are the rate commands rather than the actual rates of craft motion. The legends adjacent the leads going into and out of the resolvers 225′ and 227′ indicate the solutions of Equations 7 and 8. As in FIG. 1, if the actual roll attitude of the craft is not the same as the computed roll angle, a coordination error will exist and this coordination error and its rate may be used to control the ailerons to thereby change the craft bank angle in a direction and amount to reduce such error. When the error is zero, the actual craft bank angle will be the same as the computed craft bank angle.

Since the director gyro provides a long period or displacement reference, short period references are required for the automatic pilot of FIG. 3. A pitch rate gyro 201′, a roll rate gyro 202′, and a yaw rate gyro 203′ are used to supply this short period control. Preferably, wipe-out circuits in the yaw and pitch rate gyro signal channels should be provided to wipe out any steady-state turn signals in pitch and yaw, as also will be hereinafter more fully described.

Although in FIG. 3 the only command signals specifically illustrated are those inserted in aircraft axes, it will be understood that earth axis command signals may also be inserted as in FIG. 1, through the proper resolution thereof to command the desired precession rate for the director gyro 25 about craft axes. Furthermore, although a specific form of gyro is disclosed for providing an inertial reference axis for the aircraft, i.e., a director gyro, it will be understood that other forms of gyro references could be employed, for example, a pair of integrating rate gyros, one mounted to be sensitive about the craft yaw axis and the other mounted to be sensitive about the craft elevation axis. The results obtained by the latter will be substantially identical.

From the foregoing specific examples of autopilots built in accordance with the teachings of the present invention, it should be obvious that the same computations could be performed using digital techniques rather than the illustrated analog techniques, or a combination of both. In effect, the basic principle of the present invention is the computation or solution of geometrical equations which relate the orientation of the aircraft axes in space with respect to the direction of the unit gravity vector $g$.

In FIGS. 4 through 17, inclusive, I have illustrated another embodiment of the present invention wherein many of the computing techniques illustrated in the apparatus of FIGS. 1 through 3 are included although modified and simplified in many respects. The automatic pilot of FIGS. 4–17 is capable of fully automatically controlling the aircraft in any of a number of different modes of operation. In FIGS. 5 through 14, each of these various modes is illustrated by separate block diagrams, it being understood that suitable switching, either by stick-operated detents or selector switches, or both, is provided to place the automatic pilot in each of these various modes. FIG. 4 diagrammatically represents only the general switching required to select these various modes. The primary modes of operation are the stabilization mode and the pilot mode. These two modes may be considered together as an auto-manual mode and may be initiated by the pilot by throwing selector switch 20 to the AUTO-MANUAL position. This is the basic or normal operating mode for the automatic control system and may be used throughout most phases of flight, including take-off and landing. In the absence of command inputs to the automatic pilot, in the stabilization mode illustrated in FIGS. 5 and 6, the craft will be stabilized in any attitude in which it has been maneuvered as a result of any previous command inputs. In the auto-manual mode, whenever the pilot's control column or stick 21 is displaced from a neutral or detent position, switching automatically occurs which places the autopilot in the pilot mode of operation illustrated schematically in FIGS. 7 and 8. Also, at any time the pilot may cause the craft to roll to straight and level flight by operating a suitable button or trigger 22, preferably on the control column, which automatically places the pilot in the auto-roll out mode shown in FIG. 9.

Provision is made in the automatic pilot of the present invention for fully automatically causing the aircraft to fly a predetermined course in response to signals generated by a tracking radar and/or computer for anti-aircraft fire control or automatic navigation purposes. Such mode may be instituted by switching selector switch 20 to the TRACK position, placing the system in the configuration shown in FIGS. 10 and 11.

With pilot's selector switch 20 thrown to the NAVIGATION position, the aircraft thereafter may be automatically controlled to maintain a desired magnetic heading and altitude, or, through suitable selector knobs, may be automatically controlled to approach and maintain any compass heading set in on a suitable heading selector. In this mode radio guidance signals may also be accepted by the autopilot. Also any desired flight path angle may be selected. These navigation modes are illustrated in FIGS. 12a and 12b.

Finally, if it is desired manually to control the craft without the aid of the automatic pilot, a disengage switch 23 is provided which, in its ENGAGE position, initiates the disengage mode of operation illustrated in FIGS. 13 and 14. In this mode the automatic pilot follows up or synchronizes on all movements of the aircraft so that at any time the engage switch may be moved to its engaged position without producing abrupt engaged transients.

In all modes of operation of the present autopilot, the basic stabilization reference is, as in FIG. 3, a director gyro or $x$-axis gyro 25 which is shown schematically in FIG. 3 (referred in the description of FIG. 3 as 230 and in FIGS. 5–14 as 25) and illustrated by suitably labeled blocks in FIGS. 5–14. Referring again to FIG. 3, this director gyro comprises generally a rotor 26 driven at high speed and supported in the craft so that its spin axis 27 is normally directed along an axis substantially parallel to the fore-and-aft or $x$-axis of the aircraft (FIG. 4) but capable of limited angular movement to the right and left and up and down with respect to the aircraft $x$-axis. For this purpose, the gyro rotor 26 is rotatably supported in a rotor bearing case or frame 28 which carries the rotor drive motor stator, the motor rotor being the gyro rotor. The rotor bearing frame 28 in turn is supported by suitable trunnions and bearings in a gimbal ring 29 for rotation about a minor axis 30 normally parallel to the aircraft athwartship or pitch axis $y$ (FIG. 4). Gimbal 29 in turn is pivotally supported also by suitable trunnions and bearings in the aircraft for rotation about a major axis 31 normally parallel to the aircraft vertical or yaw axis $z$ (FIG. 4). Thus, it is apparent that the director gyro 25 is a three-degree-of-freedom gyro mounted in the aircraft so that it is capable of angular movement with respect to the craft athwartship and vertical axes or, considering that the gyro spin axis tends to remain fixed in space, it is capable of detecting angular movements of the craft about the craft pitch and yaw axes, and hence is adapted to provide a displacement stabilization reference for the yaw and pitch axes of the craft.

In order that relative movements between the gyro and craft can be detected, suitable signal generating or pick-off devices are provided, one illustrated schematically at 32 for supplying a signal in accordance with relative angular movement between the gyro and the craft about pitch axis and one illustrated schematically at 33 for supplying a signal in accordance with relative angular movement between the gyro and the craft about yaw axis. These pick-off devices may be of any suitable type which supplies an electrical signal which varies in direction and magnitude substantially linearly with the direction and magnitude of relative gyro and craft movement, at least over a predetermined range of movement. As will become apparent as the present description proceeds, it will be desired to command a change in the spatial orientation of the gyro spin axis 27, in which case torques will be applied about the gyro support axes in order to precess the spin axis about these axes as in FIG. 3. For this purpose, a suitable torque motor device illustrated schematically at 34 on the yaw support axis is provided for precessing the spin axis about the pitch axis 30 and a torque motor device illustrated schematically at 35 on the pitch support axis 30 is provided for precessing the spin axis about the yaw axis 31. Thus, it will be appreciated that in the absence of any command signals the gyro will hold its spatial orientation, and therefore, if the craft is slaved to follow the gyro spin axis, the craft will be caused to maintain the same spatial orientation, at least within the drift rate of the gyro. In short, the director gyro 25 provides a stable, long period displacement reference for the aircraft automatic pilot but is capable of being reoriented in space in accordance with commanded maneuvering signals.

*Stabilization Mode*

Now referring particularly to FIGS. 5 and 6, I have illustrated in block diagram form the active components of the automatic pilot when in the stabilization mode, FIG. 5 illustrating the pitch axis components and FIG. 6 the lateral axis components. In this mode, function or mode selection switch 20 is in its AUTO-MANUAL position and switch 23 is in its ENGAGE position. It will be appreciated that various selector switch wafers or relays are associated with selector switches 20 and 23 and would be set in the AUTO-MANUAL positions. With the control stick in its neutral or zero or detent position, the autopilot is in its "Stabilization" mode while, with the stick displaced, detents and associated relays are operated which places the autopilot in the "Pilot" mode. It will be noted that in FIGS. 5 and 6 the airplane 10 is included in the diagrams, its movement or response to control surface operation being represented by dot-dash lines which serve to illustrate the closing of the over-all or major autopilot-aircraft loop. In the stabilization mode, no input commands are present and the aircraft is slaved to the director gyro spin axis 27.

In FIG. 5, the output signal from the director gyro at lead 37, which is the output of pick-off 32, is designated as $\theta_e$ and represents the relative angular displacement or deviation $\theta_g$ between the director gyro spin axis 27 and the aircraft $x$-axis about the aircraft pitch axis $y$ and this signal will exist, at least momentarily, whenever the aircraft changes attitude in pitch, either by elevator deflection or by an external disturbance. The block labeled $K_\theta$ represents a suitable electrical attenuator or voltage selective device which provides the proper elevator deflection per degree of pitch displacement or deviation error $\theta_e$. The pitch error signal is combined with a pitch attitude rate signal, to be described below, and the algebraic sum is modified in parameter control circuit 38, which circuit is controlled in accordance with aircraft flight condition, such as dynamic pressure, such that the system gain or performance is rendered consistent with any existing air speed and altitude condition of the aircraft.

The output of parameter control circuit 38 is applied through lead 39 to the aircraft elevator servo system 40 which operates through feedback connection 41 to produce a surface deflection $\delta_e$ proportional to the modified error and error rate signal. A servo system suitable for use in the autopilot of the present invention is disclosed in copending application Serial No. 593,093, filed June 22, 1956, in the name of Brannin et al. and entitled Flight Control System.

Aircraft body-axis damping or short term stabilization in pitch is provided by a pitch rate gyro 42 which supplies a signal proportional to the rate of change of pitch attitude $q_g$ of the aircraft. This signal appears on lead 43 and is applied to summing device 44, through a suitable wipe-out circuit 45 and a $K_\theta$ attenuator, where it is algebraically combined with the pitch attitude displacement signal from director gyro 25. Thus, the effective signal applied to servo system 40 is a dynamic-pressure-modified composite attitude error and attitude error rate signal. The $K_\theta'$ attenuator determines the ratio between the magnitude of elevator surface deflection per degree per second of pitch rate. The wipe-out circuit 45 serves to reduce any steady-state pitch rate signal to zero during pitch command maneuvers and has substantially no effect other than damping as far as short term rate stabilization is concerned. In the stabilization mode, i.e., with the control stick in detent, it may be desirable, to insure that no torques will be applied to the gyro torquer 34, that the torquer be disabled as by removing its fixed field power or by rendering its amplifier ineffective as by removing its power supply or by other suitable expedient.

The operation of the pitch axis stabilization system will now be evident. If, for example, an external disturbance causes the aircraft to rotate about its pitch axis, such pitching will be detected by the director gyro 25 and rate gyro 42 and the algebraic sum of these two signals is applied to the servo system 40 to produce a surface deflection in accordance with such sum. The surface deflection will cause the aircraft 10 to pitch in a sense opposite from that detected by director gyro 25 and rate gyro 42 until the original error has been reduced to zero. In effect, the rate gyro 42 serves to maintain the aircraft's pitch rate at zero and the director gyro 25 serves to maintain unchanged the alignment between the pitch axis of the aircraft and the director gyro spin axis.

The lateral axis stabilization system is shown in block diagram form in FIG. 6 and is, of course, more complex than the pitch axis stabilization system because of the requirement that two control surfaces, at least in most aircraft, rather than the one must be considered, i.e., the control of a yaw control surface or rudder and a roll control surface or aileron. In the lateral axis, yaw displacement and rate stabilization is provided in the same manner and by similar elements as in the pitch axis. The yaw displacement error signal $\psi_e$ detected by director gyro 25 through pick-off 33, which is the algebraic difference between the angle between the director gyro spin axis $\psi_g$ and the aircraft fore-and-aft axis about the craft yaw or z-axis, is combined with a signal proportional to the yaw rate of the aircraft $r_g$ as detected by yaw rate gyro 47. Thus, the yaw error and yaw error rate signals are supplied through parameter control 48, as in the pitch axis, and serve to produce a rudder deflection $\delta_r$ in accordance therewith by means of rudder servo system 49, again a surface position feedback circuit 50 being provided for accurately positioning the rudder in accordance with the error and error rate signals. As in the pitch axis, a wipe-out circuit 51 responsive to the rate gyro signal is provided for cancelling out or removing steady-state yaw rate gyro signals during command maneuvers and hence has substantially no effect other than damping in the stabilization mode.

In the roll channel, a roll rate gyro 52 is provided, and, as in the pitch and yaw channels, this roll rate gyro provides a signal $p_g$ proportional to craft roll rate on lead 53. This signal is applied, through an attenuator device $K_{\dot{\phi}}$ and through a suitable parameter control 54, similar to parameter control 38 in the pitch channel, to produce a corresponding aileron deflection through the aileron servo system 55. Thus, aircraft roll rates are opposed by the roll rate gyro 52 in the same manner that pitch and yaw rates are opposed by the pitch and yaw rate gyros 42 and 47, respectively, and short period stabilization of the aircraft is thereby provided about all primary aircraft axes.

While rate stabilization in roll is essentially the same as it is in pitch and yaw, roll displacement stabilization is accomplished by application of a different principle because, unlike the systems of FIGS. 1 and 3, no long period roll sensor, such as a vertical gyro or pendulum, is employed in the system now being discussed. The elimination of a vertical gyro enables complete 360° maneuverability of the aircraft under continuous automatic control as set forth above in the systems of FIGS. 1 and 3. In FIGS. 4–17, the roll attitude or long period roll displacement reference for the automatic pilot is derived from the yaw displacement or deviation signal $\psi_e$ and the time rate of change or first time derivative of this signal. It should be noted that this signal, $\psi_e$, is much like a coordination pendulum signal, except that the pendulum signal need not be resolved as described hereinbelow. The yaw displacement error signal from the director gyro 25 is supplied through lead 58 through a displacement attenuator 59 labeled $K_c$, which determines the roll rate per degree of yaw displacement error and simultaneously through a time derivative network and attenuator 60, labeled $\dot{c}$ and $K_{\dot{c}}$, which provides an output only upon changes in the yaw displacement signal. The $K_{\dot{c}}$ circuit determines the roll rate per degree per second of yaw error. Both the yaw displacement error and the yaw displacement error rate signals are supplied to a summing device 61 where they are algebraically combined and supplied through lead 62 to a further summing device 63 where the latter sum is combined with the roll rate gyro signal, the total sum being applied to aileron servo system 55. The foregoing circuit provides a roll displacement reference and the manner in which this is accomplished may be thought of as follows. If the director gyro error signal is changing, it means that the aircraft fore-and-aft axis is turning with respect to the gyro spin axis, i.e., a rate of turn of the craft exists. Hence, in order to stop such rate of turn, a bank angle is required. Thus, craft roll angle is varied in accordance with the rate of change of the director gyro yaw error signal. Also, if a steady-state yaw error signal exists, it means that there is no rate of turn, but that a rate of turn had existed in order to build up the yaw displacement error. In other words, the absolute value of yaw displacement error may be thought of as the time integral of rate of turn or roll angle, and in order for the yaw displacement signal to go to zero, craft bank angle must likewise go to zero. From the foregoing, it is apparent that the rate of change of the yaw displacement error acts as a short period roll displacement reference, while the absolute value of the yaw displacement signal assures that the roll angle of the airplane will go to zero in straight and level flight. The yaw error gain and authority limits on the yaw error rate are combined in such a manner that the aileron system will not be unduly sensitive to short period yaw disturbances such as in turbulent air. The yaw error and error rate signal appearing on lead 58 is modified in accordance with the cosine of craft bank angle through a suitable resolver device 64 and since this device plays no role in the basic lateral stabilization mode its function will not be considered at this itme.

In the operation of the lateral axis stabilization system, if an external disturbance should cause the aircraft to yaw, this yaw motion will be detected by the director gyro 25 and yaw rate gyro 47 and the signal outputs thereof will operate the rudder servo 49 to produce a corresponding but opposing yaw and yaw rate of the aircraft until the initial signals are reduced to zero as in the pitch channel. Likewise, if an external disturbance should cause the craft to roll, roll rates will be opposed by the rate gyro 52 operating through aileron servo system 55. However, if such roll rate results in a rate of turn, such turn rate will be detected by director gyro 25 and will produce a roll in a sense to reduce this rate of turn through the coordination loop 58–62. The craft will thus be caused to roll back to straight and level flight. Zero roll angle will occur when the yaw displacement signal supplied to the roll servo system 55 is reduced to zero, as hereinabove described.

*Pilot Mode*

Referring now to FIGS. 7 and 8, I have illustrated in block diagram form those elements of the automatic pilot system of FIGS. 4–17 which are active during the pilot mode of operation thereof. As stated earlier in the present specification, the pilot mode is initiated by displacement or movement of the pilot's control stick or control column, FIGS. 1 and 3, from a neutral or detent position (FIG. 4) and no further operation of function selector switch 20 is necessary.

Basically, in the pilot mode, means have been provided for precessing the director gyro spin axis to a new or desired position or orientation in space by fore-and-aft or lateral movement of the pilot's stick controller as in the system of FIG. 3, and once the stick is neutralized the system reverts automatically to the stabilization mode.

The pitch axis elements active in the pilot mode are illustrated schematically in FIG. 7. However, before considering this figure, it should be noted that the autopilot maneuvering input commands are inserted directly through movement of the craft control column or pilot's stick and the signals produce a resulting movement of the craft which would be expected under direct manual control, i.e., stick force in pitch and roll produces corresponding craft rates about pitch and roll axes. The pilot's stick controller may be of the type illustrated in U.S. Patent No. 2,895,086, issued to R. H. Pettit entitled Control Stick Transducer. As disclosed in that application, the pilot's stick controller is provided with a force transducer or force pick-off mechanically actuated thereby. The signal produced by the force pick-off is proportional to the force applied by the pilot to the control column and this signal, as stated above, commands an aircraft angular rate about the craft pitch axis which is a function of the applied force. As also disclosed in the cited application, the stick also includes interlock microswitches which, among other functions, automatically place the system in the pilot mode. The pitch command signal from the pilot's control column pick-off may be designated $q_{co}$ and, since it is in aircraft coordinates, it is applied directly to the pitch torquer 34 on director gyro 25 through lead 72 after suitable amplification in a torque motor amplifier which, for simplicity of illustration, may be included in the block 34. Pitch torquer 34, therefore, will produce a torque on the director gyro 25 thereby initially generating a pitch error between the director gyro spin axis and the aircraft x-axis. This pitch error is applied to a signal summing device 74 through an attenuator $K_\theta$ which, as in the stabilization mode, determines the degrees of elevator per degree of pitch error. The control column signal is also supplied directly to the summing device 74 through the loop $K_{\dot{\theta}c}$ designated by reference character 75. This loop approximates the amount of steady-state signal required to maintain the pitch rate commanded. The stick command signal is also supplied to a summing device 78 where it is algebraically combined with the pitch rate signal from pitch rate gyro 42. The pitch rate command signal is supplied to the summing device 78 in a sense to oppose the pitch rate gyro signal. The resultant output of summing device 78 is applied through wipe-out circuit 45 and the $K_{\dot{\theta}}$ attenuator to the summing device 74 and the output of summing device 74 is applied to the parameter control 38 and elevator servo 40, these elements not being illustrated in FIG. 7 but being the same as is shown in FIG. 5.

In the operation of the pitch axis when in the pilot mode, if the pilot desires to maneuver the aircraft to a new pitch attitude or to perform any manual pitch maneuver, he moves the stick fore or aft, as the case may be, which precesses director gyro 25 and hence the airplane to a new space orientation at a rate proportional to the precession rate of the director gyro which, in turn, is proportional to the magnitude of the force applied by the pilot on the stick. In order for the airplane to maintain this pitch rate, assuming substantially zero lag in the director gyro, the elevator is proportionally deflected and maintained in this deflected position by the pitch rate command signal which is fed directly to the elevator servo through the loop 75. During the period immediately following the initiation of a pitch rate command and before the wipe-out 45 becomes effective, the pitch rate gyro 42 will tend to oppose any aircraft pitch rate. Thus, the pitch rate command signal from the stick is applied to the rate gyro output in an opposite sense to the rate gyro signal and therefore will tend to cancel this rate gyro signal and allow the aircraft to pitch at the rate commanded. Initially, and assuming the aircraft has substantial inertia, the above-mentioned lag will not be zero and the director gyro 25 will precess ahead of the aircraft x-axis, such lag tending to provide an elevator deflection in addition to that provided by the direct feed of the pitch rate command through loop 75. As the aircraft pitch rate approaches that commanded, the wipe-out 45 will become effective and will wipe out any steady-state pitch rate signal from gyro 42. Under these conditions, the loop 75 will provide most of the elevator deflection signal to maintain the commanded pitch rate. Any displacement error $\theta_e$ at the director gyro output, which may exist as a result of the integration of the difference between the pitch rate commanded and the pitch rate of the aircraft, by director gyro 25, will thereby be minimized.

The apparatus of FIG. 7, therefore, will cause the aircraft to achieve a pitch rate equal to that commanded by the pilot's stick with minimum displacement error, and therefore, it follows that upon removal of the command signal causing the system to revert to that shown in FIG. 5, i.e., the stabilization system, the airplane is referenced to the attitude maintaining at the instant the command is removed. Since the system of FIG. 7 operates to maneuver the aircraft, upon pitch rate commands, to any desired pitch attitude with substantially zero displacement error, it will be appreciated that the $K_{\theta\dot{\theta}}$ loop 80 will have negligible effect during pitch rate commands and the effect of this latter loop will be described hereinbelow in regard to the lateral control system.

The lateral axis elements active in the pilot mode of operation of the present automatic pilot are illustrated in block diagram form in FIG. 8. In the lateral axis pilot mode, two basic units are added to the lateral axis stabilization system of FIG. 6, these units being a roll computer 81 and a turn rate computer and true air speed sensor 82 (FIG. 8). The roll computer 81, like that of FIGS. 1 and 3, consists of an amplifier 83, motor 84, a rate generator or motor-speed-controlling generator 85, a sine synchro 86, a cosine synchro or resolver 64, and a sine-cosine resolver 88 (the latter not being shown in FIG. 8 since it is not effective in the pilot mode). Roll rate commands $\dot{\phi}_{co}$ from the pilot's stick are generated by the pick-off or force transducer which may be the same as the transducer in the pitch axis. It will be noted that the system of FIG. 8 differs from that of FIG. 3 in that instead of the pilot commanding a yaw rate $r_{co}$, he commands a roll rate $\dot{\phi}_{co}$. This command signal $\dot{\phi}_{co}$ is applied to roll computer amplifier 83 and an attenuator device $K_T$. The stick command signal is also supplied to a summing circuit 91 in the aileron channel through attenuator $K_{\dot{\phi}c}$ which determines the degrees/sec. of roll rate command per degree/sec. of roll rate of craft, where it is algebraically combined with a craft rate of roll signal $p_g$ derived from rate of roll gyro 52. The sum of these two signals is supplied to the aileron servo system 55 through parameter control 54 as before. The pilot mode is automatically initiated by operation of pilot's stick through suitable stick detent switches (not shown), thereby making all connections necessary for the pilot mode.

The output of the roll computer is applied as an input to the turn rate computer 82. The output of the computer 82 is, in turn, applied to the lateral axis torquer 35 of the director gyro 25 through a suitable torque motor amplifier which, for simplicity of illustration, may be included in the block 35. Also, the output of the turn rate computer 82 is applied to summing device 96 in the rudder channel where it is combined with the output of yaw rate gyro 47. The output of the summing device 96 is applied through wipe-out 51 and attenuator $K_{\dot{\psi}}$ as a further input to the rudder servo system 49.

Three auxiliary loops are illustrated in FIG. 8. The first connects the roll command signal $\dot\phi_{co}$ as a direct input to the rudder servo through attenuator $K'_{\dot\phi\psi}$. The second or $K_{\psi\dot\psi}$ loop connects the output of the director gyro 25 back to summing device 98 and the input to the torquer 35. The third compensating loop is represented by $K_{\psi\dot\phi}$ and connects the output of the cosine resolver 64 to the input of the roll command computer 81 through summing network 100. It should be noted that the stick in its detent or zero command condition, these loops are removed or rendered ineffective in the system through stick detent switches. The function of the foregoing compensating loops in the pilot mode will be set forth in the description of the operation hereinbelow.

The turn rate computer 82 shown in FIG. 16 includes essentially an air speed sensor 103 and a high gain amplifier 101. In the pilot mode, the input of amplifier 101 varies in accordance with the difference between the output of the roll command computer and a feedback signal 102 around the amplifier, which feedback is a function of the output of the amplifier 101 and the air speed of the aircraft which is sensed by the air speed sensor 103. The output of the turn rate computer 82 is applied to the summing device 98 and thence to the input of torque motor amplifier 94. Generally, the computer 82 functions to compute a craft rate of turn $r_{ct}$ about its z-axis as a function of craft true air speed V and bank angle $\phi$, as will be described below.

The coordination circuitry 59–62 in FIG. 8 is the same in the pilot mode as in the stabilization mode but modified in accordance with the operation of the resolver 64.

The operation of the lateral axis of the automatic pilot of the present invention in the pilot mode will now be described. Assume that the pilot wishes to perform a coordinated turn from one direction of flight to another and that up to that point the autopilot has been engaged and has been stabilizing the craft in straight and level flight in the stabilization mode. To initiate the maneuver, the pilot moves his stick to the right or left, as the case may be, just as he would do if flying manually. However, in the present autopilot, he need not move his rudder pedals since coordination, both during turn entry and exit and during the turn, is automatically provided. However, if desired, the pilot can override the controls and produce skid turns, etc., by rudder operation alone. Movement of the control stick automatically places the automatic pilot in the pilot mode as before. Simultaneously with a stick movement or force, a signal proportional to commanded rate of roll command $\dot\phi_{co}$ is generated at the stick force pick-up and this signal is supplied to the input of the roll computer 81. In this embodiment of the auto-pilot, in the pilot mode it is the function of the computer 81 to integrate the roll rate command $\dot\phi_{co}$ to thereby produce a computer shaft position or angular rotation equal to or substantially equal to the time integral of roll rate command or computed roll or bank angle $\phi_{ct}$. The output of the sine synchro 86 on the roll computer shaft is, therefore, equal to sine $\phi_{ct}$ or sine of the computed bank angle, and this signal, together with a signal proportional to true air speed V generated by the air speed sensor 103, is fed to the turn rate computer 82 which computes the value of the coordinated turn rate $r_{ct}$ about the aircraft vertical or z-axis according to the following equation:

$$r_{ct}=\frac{g}{V_T}\sin\phi_{ct} \qquad (9)$$

which is substantially the same as Equation 3 above, simplified to the extent that the cos $\gamma$ term is omitted. For greater accuracy, the cos $\gamma$ term can be added, but for most flight maneuvers this added accuracy is not needed. The turn rate computer 82 functions to compute the computed turn rate $r_{ct}$ for the computed bank angle $\phi_{ct}$ by virtue of the fact that since the input to the computer amplifier 101 is sin $\phi_{ct}$ and its output is fed back inversely to its input after being modified in accordance with true air speed, as by a "g" calibrated resistor or potentiometer winding 107 and wiper 108 positioned in accordance with true air speed V, the total or resultant output of the amplifier 101 will be proportional to $$\frac{g}{V}\sin\phi_{ct}$$

or $r_{ct}$. This equation is applicable when the craft pitch angle $\theta_{AP}$ is assumed small and the apparent gravity angle $\sigma$ is zero, i.e., zero side-slip or skid. The compensating loops, which will be described below, are provided for compensating for the effects of pitch attitude and apparent gravity angle error on the foregoing solution.

Thus, as so far described, the roll computer 81 and turn rate computer 82, in responding to the movement of stick 70, generate a signal proportional to the computed rate of turn $r_{ct}$ of the aircraft about the craft z-axis. This signal is applied to the director gyro torquer 35 and will thereby precess the same with respect to this axis and at this computed rate.

The roll rate command signal $\dot\phi_{co}$ is also supplied directly to the aileron servo system 55, attenuator $K_{\dot\phi c}$ (which determines the degrees/second of commanded roll rate per degree/second of aircraft roll rate), and summing circuit 91. At summing circuit 91, the actual craft roll rate $p_g$, as measured by rate gyro 52, is compared with the commanded roll rate and the error applied to the aileron servo 55. The operation of the aircraft in response to aileron deflection, i.e., craft rolling motion $\dot\phi_{AP}$, serves, in effect, to integrate the roll rate command signal with respect to time and, therefore, upon removal of the roll rate command signal a finite craft roll angle $\phi_{AP}$ will exist.

Assuming that the aircraft response is such that it perfectly integrates the roll rate command signal and that the roll computer 81 also perfectly integrates the roll rate command, the computed roll angle and actual roll angle will be the same at any point in time. If there are any integration errors by either the craft or the roll computer, compensating and coordinating circuits, to be described below, have been provided for correcting or removing the effects of such errors. Assuming small pitch angle and substantially zero apparent gravity angle, the the airplane, when performing a coordinated turn, obeys the following equation, $$r_{AP}=\frac{g}{V}\sin\phi_{AP} \qquad (10)$$

which is substantially the same as Equation 9 above. Since, in the above operation, the director gyro 25 is being precessed about the craft z-axis at a rate proportional to the computed turn rate $r_{ct}$, as computed by the turn rate computer, and the craft has been put into a corresponding bank angle $\phi_{AP}$ by the aileron servo system, the precession rate of the director gyro spin axis in space and the precession rate of the airplane about its z-axis will be equal and, being equal, there will be no error $\psi_e$ between the director gyro spin axis orientation and the aircraft x-axis orientation as a function of time and the aircraft will thus be in a coordinated turn at the computed turn rate, i.e., $r_{ct}=r_{AP}$.

It will be appreciated that when the roll rate command is removed, i.e., the stick is moved back to its neutral or detent position, the autopilot is reverted to its stabilization mode. Also, when the stick is neutralized, the roll computer 81 is clamped at its attained position as by removing power from the motor 84, etc., through stick controlled detent switches. Its output then continues to control the turn rate computer to thereby apply the precession rate signal for the director gyro 25 to maintain the precession of rate corresponding to the commanded rate of turn. In the absence of any command from the stick, the airplane roll is stopped at the computed bank angle and the roll rate gyro 52 continues to stabilize the aircraft in bank against short period roll disturbances. Also, yaw rate gyro 47 stabilizes the craft against short period yaw disturbances while steady-state yaw rates are removed by operation of wipe-out circuit 51.

Thus, in this embodiment of the computing autopilot of the present invention, it will be appreciated that we have provided a system which possesses all of the advantages of a rate reference system, i.e., unlimited maneuverability without its attendant disadvantages (no long period earth-based displacement references) and also a displacement system, relatively long period displacement control, without its attendant disadvantages (poor short period stabilization). In other words, maneuvers are performed by precessing a three-degree-of-freedom or displacement-type gyro to achieve any desired spatial orientation thereof, and if the aircraft directional axis is always maintained in close alignment with the gyro-defined axis, it, too, can be made to assume any spatial orientation without complex cross-controls and without gyro gimbal errors. Furthermore, by the present embodiment of the invention, the director gyro can be used as a long term reference for craft bank angle through the roll computer and turn rate computer and the coordination compensation circuits, thereby eliminating the requirement for a vertical gyro with its attendant disadvantages as regards craft maneuverability.

In the previous paragraphs, it was assumed that both the airplane and the roll computer integration characteristics were perfect. In practice, this may not be the case and if perfect integration is not assumed, the airplane actual roll angle and the roll angle computed by the roll angle computer will differ by the integration error of the aircraft and/or the roll computer. Such an error will result in a difference between the precession rate of the airplane about its z-axis and the precession rate of the director gyro 25 about the craft z-axis, this error being represented by $\psi_e$ and appearing as an output error signal from synchro 33 on the yaw axis 31 of director gyro 25. This error signal will operate through the coordination circuit 59–62 as described hereinabove with respect to the stabilization mode, in a manner to reduce this error signal to zero by changing the craft bank angle through aileron servo 55. In other words, any error between the turn rate commanded and the turn rate actually achieved will be removed by altering the bank angle of the airplane and thus the actual turn rate to make the actual turn rate equal to the turn rate commanded, i.e., stored in the roll computer. Generally, then, what occurs in this:

(1) The pilot commands a rate of roll.
(2) The craft integrates the rate of roll command to produce a craft bank angle.
(3) The roll integrator integrates the roll rate command to produce a computed roll angle.
(4) The turn rate computer computes the precession rate for the computed bank angle and correspondingly precesses the director gyro spin axis about its z-axis at the commanded rate.
(5) If the craft rate and the commanded rate are different, the craft bank angle is changed an amount such that the craft turn rate and the commanded turn rate are the same and, therefore, the actual bank angle of the craft is the same as the computed bank angle.
(6) Thus, the roll computer shaft position is an accurate measure of craft bank angle.

It should be pointed out that aircraft maneuvers in response to either pitch rate commands or roll rate commands result in rates of turn about aircraft axes rather than about earth-referenced axes because the craft is being caused to follow a space reference rather than an earth reference or references.

The director gyro 25, as described earlier, is mounted in the aircraft such that its spin axis or space vector orientation normally is parallel to the fore-and-aft craft axis. That is to say, the director gyro pick-offs or synchros are physically mounted in the craft such that when their outputs are zero, the gyro spin axis is normally parallel to the craft fore-and-aft axis. This fore-and-aft axis is the axis about which the aircraft normally rolls, i.e., it is the aerodynamic roll axis of the aircraft, and since this aerodynamic roll axis may continually shift as a function of flight condition, it is possible and probable that a pitch angle will exist between these two axes. This pitch angle may, for example, be the result of the angle of attack of the craft necessary to maintain its lift for a given air speed condition. Also, this error may exist during acceleration conditions of the craft either fore and aft or lateral as due, for example, to changes in air speed and/or turns. This angle between the director gyro spin axis and the aerodynamic roll axis of the craft may be defined as $\theta_T$ and its effect is most deleterious during roll and pitch command maneuvers of the aircraft because director gyro precession is computed on the basis that the gyro spin axis is initially parallel to the aerodynamic roll axis or craft fore-and-aft axis. If there is an initial misalignment or tilt $\theta_T$ between the gyro spin axis and the aerodynamic roll axis, a yaw error $\psi_e$ will build up as the aircraft performs the roll maneuver command, which error will be equal to the integral of the aircraft roll rate times the sine of this error angle $\theta_T$. This is an undesirable term in the autopilot signal system and should be eliminated or at least in some way compensated. In the automatic pilot system of FIGS. 7 and 8, this undesirable term is eliminated through the operation of the compensating loop indicated as $K_{\psi\dot{\psi}}$ connected around the director gyro 25. This loop is rendered effective whenever the control stick is moved out of detent and functions to limit the yaw error signal associated with undesired yaw rates resulting from gyro tilt $\theta_T$. The block $K_{\psi\dot{\psi}}$ represents an attenuator which provides the desired degrees per second of director gyro precession rate in yaw per degree of yaw error. The means by which this $K_{\psi\dot{\psi}}$ loop accomplishes the desired objective is clearly seen when it is understood that the rate of increase of the undesired signals is proportional to the product roll rate and the misalignment $\theta_T$ of the director gyro from the flight path axis. Since the signal builds up rapidly with high roll rates, a loop around the director gyro allows this error to be wiped out. The value of the proper wipeout rate must be carefully selected for optimum system response. Another means for compensating this error, as described later, is implied in FIGS. 1–3, where a more complete computation of system parameters is supplied. In this case, the product of angle of attack and roll rate or roll rate command are the quantities used for the compensation as disclosed. In this connection, and referring briefly back to FIG. 7 which illustrates the present autopilot in the pitch axis pilot mode of operation, the loop identified by the block $K_{\theta\dot{\theta}}$ around the director gyro 25 is an extension of the same compensation, since whenever an aircraft rolls, yaw errors are converted or at least partially converted to pitch errors in accordance with a function of roll angle.

Another significant compensating loop that is active in the pilot mode of operation of the present automatic pilot is that represented by the block $K_{\psi\dot{\theta}}$. This loop is connected to supply the director gyro error signal to the input of the roll computer 81 through the cosine $\phi_{ct}$ resolver 64 on the roll computer output shaft. If the pilot commands successive or continuous roll rates, an integration error may build up between the roll computer angle or computed bank angle $\phi_{ct}$ and the actual aircraft roll angle, which error may result in a miscomputation by the turn rate computer 82. Since an output of the director gyro may be considered as a measure of miscomputed turn rates, this error may be used to compensate for any built up integration errors in the roll computer 81. This compensation by the $K_{\psi\dot{\theta}}$ loop is valid only with proper polarity considerations, and it is the function of the cosine resolver 64 to supply the proper polarity for this compensation signal.

At this point, it should be noted that the coordination compensation circuit 59–60 input is also supplied through the cos $\phi_{ct}$ resolver 64. In effect, this resolver is a sign or polarity changer and is effective for reversing the sign of the coordination signal whenever the aircraft is maneuvered to an inverted flight condition, since the cosine signal changes polarity at 90° and 270° of bank angle.

At this point a modification of the automatic pilot of the present invention will be described, since in this modification the above discussed problem associated with the variation $\theta_T$ between the space vector defined by the director gyro spin axis and the aerodynamic roll axis of the aircraft is eliminated by alternate means, and hence the compensating loops $K_{\psi\dot\psi}$ and $K_{\theta\dot\theta}$ may be eliminated. This modification is illustrated in block diagram form in FIG. 17. The apparatus disclosed in this figure is essentially the same as that shown in FIG. 8, except that some of the compensating loops have not been illustrated for the sake of clarity and simplicity. It will be noted in FIG. 17 that the compensating loop $K_{\psi\dot\psi}$ has been intentionally eliminated and the compensation performed by this loop in FIG. 8 is accomplished in FIG. 17 by inserting into the lateral torquer 35 of the director gyro 25 a compensating signal which is proportional to the product of the angle of attack $\alpha$ of the craft and the roll rate command $\dot\phi_{co}$ from the control stick. For this purpose, an angle of attack sensor 115 is mechanically coupled with a suitable signal generator device, such as a potentiometer 116, whose signal output is proportional to the angle of attack of the aircraft. This signal is applied as one factor to the multiplier circuit 117. The other factor supplied to the multiplier circuit 117 is the stick roll rate command signal $\dot\phi_{co}$. In effect, what has been done is that during commanded maneuvers the spin axis of the director gyro is biased in accordance with angle of attack and hence in accordance with the above-mentioned error $\theta_T$. Since this error is most pronounced upon command maneuvers, the angle of attack compensation is rendered effective only during command maneuvers by means of the multiplier circuit 117, since if the stick signal is zero the output of the multiplier will also be zero. The circuit of FIG. 17 makes the precession rate of the director gyro that which the turn rate computer commands, regardless of the misalignment error $\theta_T$. An alternative arrangement for performing the above biasing in accordance with angle of attack would be to insert the compensating signal in the output of the director gyro during roll rate maneuvers of the aircraft. This may be accomplished by inserting the output of angle of attack sensor pick-off 116 into the output of the yaw synchro 33 of director gyro 25 through a suitable lag circuit, so that in effect the gyro is biased in accordance with the misalignment error $\theta_T$. The lag circuit prevents short period angle of attack signals from influencing the servo system.

*Roll Out Mode*

In accordance with a feature of the present embodiment of the automatic pilot of the present invention, the human pilot is provided with a positive means, operable independently of stick movement, for causing the aircraft to return to straight and level flight from any banked attitude. This mode of operation is identified herein as the roll out mode, and it is instituted by the pilot's operation of a suitable roll out button or trigger switch 22 shown schematically in FIG. 4. Pressing the button energizes suitable relays to thereby operate switches which place the pilot in the roll out mode as shown in FIG. 9. It should be stated here that no further operation of the main function selector switch 20 (FIG. 4) is reqquired so that function selector switch 21 remains in the AUTO-MANUAL position. Upon operation of roll out relay, any existing stick signal is removed from the input to the roll computer 81 and simultaneously the stick detent controlled relays are operated to thereby place the pilot in its stabilization mode. However, one important change is accomplished by the roll out button and that is to connect the output of the roll command computer 81 back to its own input, thereby placing the same in a follow-up condition. Also, the output of the roll computer 81 (which in this case is also its input) to the summing device 63 (FIG. 9) and thence to the aileron servo system 55. Also through roll out switching, the turn rate command signal appearing at the input of torque motor 35 is supplied to the summing circuit 96, as in the pilot mode, and thence to rudder servo 49. It should be noted also that the roll out switch associated with the stick controls interlock circuits in such a manner that the roll computer is permitted to reduce its output to zero and, on reaching zero, it will become clamped thereby supplying no further roll command signal. It will also be noted that in the follow-up loop around the roll computer 81 a limiter 127 is provided. It will be seen that on operation of the roll out switch 22 the autopilot system is converted to the configuration illustrated in FIG. 9.

Assuming that the roll out switch is operated by the pilot with the craft in a banked attitude, the sequence of the operation of the system in the roll out mode is as follows. No further lateral stick movement will control the system. The roll computer 81 is placed in a follow-up condition so that the output signal from the sine synchro 86, which is a measure of the existing bank angle as above described, will be fed back through limiter 127 to the input of amplifier 83 and will, therefore, begin to drive roll computer motor 84 in a direction and eventually to an amount to reduce the output of synchro 86 to zero. Simultaneously, the output of the sine synchro is fed through the $K'_{\phi c}$ loop to the aileron servo system where it produces a craft rolling motion toward level flight. The function of the limiter 127 on the output signal from the synchro 86 is to limit the magnitude of this signal to some predetermined value and thereby limit the rate of roll of the aircraft in returning to level flight, and also the speed at which the computer motor 84 reduces the output of synchro 86 toward zero.

During the roll to level flight and the reduction of the bank angle measure by the roll computer, the rate of turn command computer 82 supplies a decreasing turn rate command signal to the lateral torquer 35 of director gyro 25 so that the precession thereof will also be reduced. Since Equation 9 above still holds true, the gyro precession will be reduced toward zero at a rate proportional to that of the roll computer. As in the pilot mode, the turn rate signal $r_{ct}$ is also supplied to buck out the output of yaw rate gyro 47 through summing circuit 96 so that the rate gyro signal will not oppose the decrease in yaw rate. When the output of sine synchro 85 on the roll computer 82 reaches zero, the craft is theoretically in a level attitude and further motion of the roll computer motor 84 is positively stopped through the operation of a suitable zero deflection switch on the roll computer shaft, as illustrated in block form in FIG. 9, the latter supplying a clamping voltage to the roll computer amplifies 83. If, for any reason, the aircraft had not reached a level flight attitude on clamping of the roll computer 82 at the zero computed bank angle, the coordination compensation network 58–62 will correct the roll attitude error in the manner set forth above in connection with the stabilization mode of operation of the system. In the foregoing manner, the airplane will be automatically rolled to level flight attitude and will thereafter be stabilized with respect to the spin axis of a free gyro, since all inputs to the director gyro 25 will be zero.

In the description of the present embodiment of the autopilot system as thus far given, it will be appreciated that the automatic pilot possesses several unique features and these may be set forth briefly as follows:

(a) The automatic pilot system provides both short and long period stabilization of the aircraft about a space vector defined by the space vector of the director gyro.

(b) The system provides for command inputs from the human pilot which enables the aircraft to be maneuvered by changing the orientation of the space vector defined by the director gyro, such maneuvers being completely independent of earth reference axes, thereby permitting the said maneuvers of the aircraft to be angularly unlimited.

(c) In accomplishing the above, the system operates on the basis of computed roll and pitch displacement data and hence eliminates the necessity of a roll and pitch displacement gyro and, therefore, it is free of all disadvantages that such a gyro inherently possesses.

(d) Since the director gyro is a three-degree-of-freedom gyro and tends to maintain its spin axis fixed in space in the absence of precession torques thereon, the spin axis becomes a long term displacement reference for the yaw and pitch axes of the aircraft, at least within the drift rate of the gyro.

*Track Mode*

It is in the track mode of operation of the automatic pilot of the present invention that the advantages of a director gyro type reference are most predominant. With the present day perfection of radar, and its incorporation in aircraft for the purpose of detecting the azimuth, elevation, and range position of objects relative to the aircraft carrying the radar, this information may be employed for directly controlling the aircraft through the autopilot so as to cause it to seek out and track down such objects to the end result that said objects may be precisely followed or, in military aircraft, that destructive weapons such as guns or rockets may be effectively employed. An example of such airborne radar equipment may be found in copending application Serial No. 244,761, filed September 1, 1951, in the name of E. B. Hammond, Jr. This radar is of the type that supplies information as to the azimuth and elevation errors of the detected object relative to the attacking aircraft. Preferably, this radar is gyro stabilized with respect to the fore-and-aft axis of the aircraft.

When employed on aircraft having guns or rockets having fixed trajectories relative to the craft fore-and-aft axis thereof, the radar information supplied may be inserted into a computer and the output may include any lead angle and/or ballistic corrections necessary to direct the fore-and-aft axis of the aircraft and hence the direction of fire of the guns or rockets, to an orientation such that these weapons, when fired, will hit the detected target. Since such a radar normally supplies azimuth and elevation error signals as measured in the attacking aircraft's coordinate system, the director gyro is ideal since it controls the aircraft with respect to the aircraft's reference axis system.

Referring briefly to FIG. 4, the track mode of operation may be instituted either automatically or manually by throwing function selector switch 20 to its TRACK position. As disclosed in the above-mentioned application Serial No. 244,761, the tracking function may be automatically initiated through the radar. For example, in an acquisition mode, the pilot may fly the aircraft manually until smooth tracking signals are generated by the radar, at which time automatic tracking by the radar may be instituted and, for example, at a predetermined range, automatic means may be operated to initiate the track mode by which the aircraft is then controlled automatically to cause it to fly a predetermined course determined by the radar tracking and computer information.

With the function switch 20 in the TRACK position, the automatic pilot components then active are illustrated in block diagram form in FIGS. 10 and 11.

In the elevation channels shown in FIG. 10, the track error signal $\theta_{Tr}$ from the radar or other tracking apparatus (for example an infrared detecting system), illustrated schematically by block 130, is compared with the director gyro error signal from synchro 32 at comparison or summing circuit 131. The gyro error $\theta_e$ is, of course, the angular difference between the orientation in space of the aircraft fore-and-aft or x-axis and the gyro spin axis 27, while the $\theta_{Tr}$ error is the difference between the directional orientation of a space vector determined by the radar and/or computer and a craft reference axis. Any error between $\theta_{Tr}$ and $\theta_e$ is applied to elevation torque motor and amplifier 34. This resultant error causes a precession of the director gyro in a direction and to an amount necessary to wipe out the elevation error $\theta_e$ and thereby bring into substantial parallelism the spin axis of the director gyro and, therefore, the fore-and-aft, axis of the aircraft through the elevator servo system 40 (not shown in FIG. 10), and the orientation of the space vector defined by the radar apparatus 130. It will be noted that since the elevation error signal $(\theta_{Tr}-\theta_e)$ controls the servo through a precession of the director gyro 25, this elevation error is removed or wiped out in a smooth manner. Also, the elevation error is applied to summing circuit 78 for the purpose of bucking out the pitch rate gyro signal from the pitch rate gyro 42 during elevation maneuvers and before the wipe-out 45 becomes effective. This latter loop functions in the same manner as in the pilot mode.

It will be noted that since any gust disturbance acting about the elevation axis of the aircraft is reflected equally in the director gyro error signal $\theta_e$ and in the track error signal $\theta_{Tr}$, such external disturbance will not cause any precession of the director gyro. The system, therefore, is not sensitive to external gust disturbances. This feature is also set forth in the above-mentioned copending Abzug application Serial No. 498,352. As stated above, this system is ideal for aircraft having high pointing accuracy requirements such as those for fixed guns and/or rockets, since the axis about which the aircraft is stabilized is the normal firing or launching axis of these weapons.

In operation of the elevation track mode, and assuming zero gyro error $\theta_e$, a tracking error from the radar sight and/or computer 130 will initially cause a precession of gyro 25 through torquer 34 and a resultant gyro error $\theta_e$. This gyro error will be supplied to the elevator servo system 40 to cause a pitch maneuver of the aircraft. Also, the same error signal will be fed back and compared with the tracking error in a sense to oppose such error. Thus, it can be seen that since the director gyro error $\theta_e$ produces a proportional rate of pitch of the aircraft, the tracking error $\theta_{Tr}$ will be reduced at a rate proportional to this error, the system being satisfied as $\theta_{Tr}$ is asymptotically reduced to zero.

As in the elevation channel during the track mode, the azimuth channel in this mode accepts tracking commands from the track error sensing system 130 and precesses the director gyro in azimuth in a direction and to an amount such as to reduce the error to zero. This mode of operation is shown in block diagram form in FIG. 11. In FIG. 11, it will be noted that the track mode is similar in many respects to the pilot mode except for the source of command signals and certain compensation loops which are used in the pilot mode that are not used in the track mode. With the setting of the function selector switch 20 to the track mode, it can be seen in FIG. 11 that the azimuth track error signal $\psi_{Tr}$ is compared directly with the output $\psi_e$ of the director gyro 25 through a feedback loop connected around the roll computer 81, turn computer 82, torquer 35, and director gyro 25. Thus, as in the elevation tracking mode, the aircraft is controlled about its azimuth axis to reduce the tracking error signal to zero at a rate proportional to such error.

The most essential change brought about by operation of the function selector switch wafers from the PILOT to TRACK positions may be seen clearly in FIG. 11, wherein a feedback loop 135 labeled $K_{\psi Tr}$ is connected around the roll computer 81, i.e., from the output of the sine synchro 86 to the input of computer amplifier 83.

The effect of this loop on the system is to make the azimuth track error signal $\psi_{Tr}$ command a bank angle rather than a roll rate as in the pilot mode. In this sense, the track mode is similar to the roll out mode to be described below. Thus, the roll computer 81 is driven through an angle proportional to the track error $\psi_{Tr}$. In this mode, the output from sine synchro 86, which is proportional to the sine of the computed bank angle, is applied to the turn rate computer 82 (FIG. 16) which computes the turn rate $r_{ct}$ of the aircraft about the aircraft z-axis in accordance with Equation 9 above, just as in the pilot mode of operation. Also, as in the pilot mode, the computed turn rate is applied to the summing circuit 96 to buck out the transient yaw rate signal from rate gyro 47 before the wipe-out 51 becomes effective, thereby allowing the craft to assume the commanded rate of turn through the rudder and aileron servo systems 49 and 55. The primary signal input to the aileron servo 55 is derived from the input to the roll computer amplifier 83 and is a signal which is proportional to the difference between the commanded bank angle as derived from the azimuth error signal and the output of the roll computer 81, i.e., the computed bank angle. This aileron command signal, then, is proportional to the roll computer rate command and is fed to the aileron channel through attenuator $K_{\phi c}$ where it is compared with the output of the roll rate gyro 52 as at summing circuit 91, the resultant signal being applied to the aileron servo system 55. The aircraft is thus rolled at substantially the same rate that the roll computer 81 computes the bank angle required by the azimuth command signal and comes to rest at substantially the same roll angle as that computed. If an error in computation exists, coordination between turn rates $r_{ct}$ and bank angle $\phi_{AP}$ is accomplished in exactly the same manner as set forth above in regard to the stabilization and pilot modes, through coordination compensation circuits 58–61.

Two gain controls are significant in the lateral axis track mode and they are: (a) the gain determined by the setting of the attenuator $K_{\phi Tr}$ 135 in the roll computer feedback loop. This setting determines the rate at which the roll computer will generate the computed roll angle and hence the rate at which the aircraft will actually achieve the roll angle through the $K_{\phi c}$ loop in the aileron servo 55; and (b) the gain represented by the ratio $$\frac{K_{Tr}}{K_{\phi Tr}}$$

This latter ratio determines the magnitude of the bank angle per degree of track error, i.e., the rate at which the lateral axis system reduces the track error. Since the track error $\psi_{Tr}$ commands a rate of turn, the rate of turn is proportional to the track error and hence the system will reduce such track error at a rate proportional to the error.

It should be re-emphasized that in the track mode-lateral axis the initial command signal or azimuth track error signal commands a bank angle, and through the turn rate computer 82 computes the turn rate of the aircraft about its z-axis for this computed bank angle using Equation 9 above and torques the director gyro 25 about the aircraft z-axis at this rate. At the same time the same signal from which the computed bank angle is derived is supplied to the aileron servo system to bank the aircraft to the same bank angle. Thus, the aircraft actual rate of turn about the craft z-axis and the computed rate of turn should be theoretically identical. However, if there are any errors in the computing devices 81 and 82 and/or in the servo system 55 in its response to the roll command, such errors will be reflected in a miscoordination of the turn, i.e., the director gyro will be precessing too fast or too slow for the rate at which the craft is actually turning as a result of the bank angle. As in the pilot and stabilizaton modes, this miscoordination signal is applied to the coordination compensation circuits 58–61 and corrects the actual bank angle of the craft so that it agrees with the azimuthal precession rate of the director gyro 25 and hence the computed bank angle $\phi_c$ is a measure of the actual craft bank angle.

*Navigation Mode*

In the embodiment of the present invention shown in FIGS. 1 and 3, command maneuvers of the aircraft have been supplied in either the aircraft or earth coordinate systems. However, thus far in the description of the present embodiment of the automatic pilot of the present invention, all command signals for controlling the aircraft have been supplied in, and all resultant maneuvers thereof have been performed about, the aircraft's coordinate reference system. In the navigation mode of the automatic pilot, however, means are provided for causing the craft to be maneuvered to and maintained on any desired heading with respect to a predetermined heading, for example, a magnetic heading and/or to be maneuvered to and maintained at any altitude above the earth or to make any predetermined flight path angle with respect to the geo-horizon or earth's horizon. In other words, the autopilot in the navigation mode accepts command signals as measured with respect to earth-based references or the earth's coordinate axis system, and these signals are suitably modified or converted from earth axes to craft axes so that the automatic pilot may be maneuvered about aircraft axes but primarily referenced to the earth axis.

The navigation mode of operation of the present automatic pilot is initiated as in the other modes by the pilot throwing his function selector switch 20 of FIG. 4, this time to its NAVIGATION position. While, for illustrative purposes, the navigation mode is shown as not accepting signals from the pilot's stick 21, in actual practice it is possible, if desired, to have even the navigation commands inserted through the pilot stick 21, or if desired through an auxiliary navigation control stick. In either case, the stick commands, which normally are commands with respect to aircraft axes, would be converted to commands with respect to earth axes.

The navigation mode of operation of the automatic pilot of the present invention is illustrated in block diagram form in FIGS. 12a and 12b, it being understood that suitable interlocks controlled from switch 20 are actuated to effect the connections shown in these figures.

For the navigation mode of operation of the automatic pilot system, two new basic components must be added. These two components are the very long period, earth-based references which supply heading information and altitude information, that is, supply long period azimuth and long period pitch references to which the aircraft, through director gyro 25, is slaved. As stated hereinabove with respect to the previous modes of operation, the aircraft is stabilized with respect to space axis for short periods through the pitch, yaw, and roll rate gyros, 47, 51, and 52, respectively, and for relatively long periods through the director gyro 25, the latter periods being defined by the drift rate of the director gyro. In the navigation mode, the effects of drift of the director gyro are removed since in this mode very long period earth-based references are provided to which the director gyro in effect is slaved.

The first of the basic long term references for the automatic pilot is a directional or heading reference 139 such as a magnetic compass. This reference device may be a flux valve-controlled directional gyroscope or gyro-magnetic compass and may be of the type illustrated in U.S. patent to O. E. Esval and C. A. Frische, No. 2,357,319, which patent is assigned to the same assignee as the present invention. The second basic long term reference of the present invention is a vertical reference device such as an altimeter or other altitude reference device 140 and may be of the type disclosed in the U.S. patent to H. Miller and R. D. Love, No. 2,729,780, also assigned to the assignee hereof. Other means may also be used for sensing altitude as, for example, a radio altimeter or combined radio and barometric altimeter devices. As illustrated in FIG. 12a, both the heading reference and the altitude reference devices may control suitable follow-up computers such as heading computer 141 and rate of climb computer 142.

In the navigation mode of operation, five principal navigational input commands may be inserted into the automatic pilot; these are a pitch rate command $\theta_{co}$ and a heading rate command $\dot{\psi}_{co}$ through a suitable control stick C, an altitude select command $h_{co}$, a flight path angle command $\gamma_c$ and a heading select command $\psi_{co}$. As will become apparent, all these commands are in earth coordinates and, therefore, may be converted into aircraft coordinates for acceptance by the automatic pilot. These commands may be inserted into the system in two ways: by selector knobs associated with the heading follow-up 141 and by flight path angle and rate of climb follow-ups 122 and 142, respectively, or by control stick steering commands from the pilot's control column or other control stick C. In FIG. 12a, yaw and pitch rate commands are inserted via the control stick by throwing switches 164 (as by column detent switches or by manual switches) to their control stick steering positions, while heading select, altitude select, and flight path angle select commands are inserted via heading selector knob 144 associated with the heading computer 141 and flight path angle selector knob 134 associated with the flight path angle computer 122 and selector knob 135 associated with rate of climb computer 142. These will be further described below.

The heading computer 141 is usually maintained in continuous follow-up on the heading reference 139 and may, therefore, be provided with an indicator 143, FIG. 14, for continuously indicating the magnetic heading of the aircraft, and through heading selector knob 144 may be designed to enable the pilot to select any desired heading to which the aircraft may thereafter automatically turn or approach, and thereafter maintain for extended periods of time. As will be described, during control stick steering, the heading selector knob and associated indicator is caused to follow the heading of the craft so that upon removal of control stick steering the heading selector will be synchronized with the then existing heading. During all modes but the navigation mode, the heading computer output terminates at an open terminal so that its signal does not influence the autopilot. In the navigation mode, the rate of climb computer 142 is normally clamped such that the aircraft maintains or holds an existing altitude, i.e., zero rate of climb or zero flight path angle. However, during control stick steering, it is unclamped such that it may synchronize to changes in altitude or altitude rate as commanded by the control stick. Flight path angle commands produce through the autopilot a predetermined rate of climb for a given air speed, to be described below, so that the rate of climb computer is, of course, unclamped during these commands. As with the heading computer 141, the rate of climb computer output likewise terminates at an open terminal in all but the navigation mode. Since the flight path angle computer 122 and the rate of climb computer 142 function to command a pitch attitude of the aircraft, these units together may be termed a barometric pitch control. Furthermore, these units supply information from which the instantaneous pitch attitude of the aircraft may be derived as in FIGS. 1 and 3.

Preferably, the heading computer 141 is a panel mounted instrument and consists of an electromechanical follow-up on a magnetic reference device such as magnetic compass-slaved directional gyro so that its shaft position continuously represents the absolute magnetic heading of the craft. This follow-up is shown schematically in FIG. 12a and comprises a synchro 145 energized from the heading reference 139 and driven by follow-up motor 146. An amplifier 147 is responsive to the difference in position between the computer output shaft 148 and the heading defined by the heading reference 139, and therefore, the motor 146 is driven in a direction and to an amount such as to maintain this difference substantially zero. The generator performs the usual servo stabilization function. The output shaft 148 of heading computer 141 operates directly a pointer 149, the position of which therefore indicates the heading of the aircraft on fixed heading scale or compass scale 150 (FIG. 15). Thus, the instantaneous magnetic heading of the aircraft is always visually indicated to the pilot. Also mounted on the output shaft 148 of the heading computer 141 is the rotor 151 of a heading selector synchro 152, the stator 153 of which is adjustably supported in the instrument in a manner such that it may be rotated relative to the instrument housing and relative to the heading selector rotor 151. This stator may also carry a heading selector pointer 154 (FIG. 17) which may be concentrically mounted with heading pointer 149 and adapted to be read against the same fixed scale 150. Positioning of heading selector stator 153 relative to the housing is accomplished by means of heading selector knob 144 suitably drivably connected thereto. Thus, it will be clear that the heading computer is a more or less conventional heading repeater instrument incorporating means for selecting any desired heading with respect to the heading at which the aircraft is at any time flying. For example, if it is desired to change craft heading by a predetermined amount, the pilot rotates selector knob 144 and positions heading selector pointer 154 to the new desired heading. Such rotation will cause relative angular displacement between stator 153 and rotor 151 of heading selector synchro 152, resulting in an error signal being generated in the synchro output 155 which is a measure of the difference between the existing heading of the aircraft and that to which it is desired to fly. Since this measure commands a rate of turn in the autopilot system, this measure therefore may be considered a rate command $\dot{\psi}_{co}$. The turn rate of the aircraft may therefore be limited by limiting the magnitude of this error signal, as by limiter 133.

With the provision of control stick steering, means are provided in the heading computer 141 for causing the heading selector synchro stator to follow the heading of the craft commanded by control stick steering. In the illustrative embodiment of FIG. 12a, this means comprises a magnetic clutch 132 coupled between heading pointer shaft 148 and a shaft coupling heading selector knob 144 with heading selector pointer 154. Whenever control stick steering is initiated, this clutch is energized, as by suitable detents, thereby mechanically coupling these two shafts together and causing heading selector synchro stator 153 to follow movements of its rotor 151 and thereby maintain its output zero. However, when control stick steering is removed, the clutch is unenergized thereby allowing relative movement of the rotor 151 relative to stator 152 and hence allowing an error signal to be generated in accordance with such movement.

As stated previously, the long term pitch reference of the automatic pilot is derived from barometric data, i.e., a barometric pitch control which comprises generally two electro-mechanical instrument servos; a flight path angle computer 122 and a rate of climb controller 142. Essentially, the rate of climb controller 142 is a servo-driven altitude monitor, while the flight path angle control is a positional servo. The barometric pitch control serves to control the pitch attitude of the craft during four principal modes of operation thereof; a synchronization mode (s), a flight path angle hold mode ($\gamma$), a flight path angle select or command mode ($\gamma_{co}$), and an altitude select or command mode ($h_{co}$). The modes are selected by means of switching between the two instrument servos and each position of the switch is correspondingly labeled in FIG. 12a. The rate of climb controller or computer 142 comprises the altitude sensor 140, a pick-off 160, a follow-up motor amplifier 161, motor 162, rate generator 163, an output shaft 165, and a differential mechanism 166. The mechanical and electrical arrangement of these elements may be as disclosed in the above-mentioned Miller-Love patent but are shown here schematically for the sake of simplicity and clarity. Similarly, the flight path angle computer comprises a follow-up motor amplifier 180, motor 181, generator 182, synchro control transformer 183, a sine function generator 184, and a preferably linear pick-off 187. The electrical interconnections between these two units to thereby make up the barometric pitch controller will become clear when considered in connection with the following description of the operation of the same under the various control modes.

The synchronization mode is used whenever the aircraft is being controlled in accordance with movement of control stick commanded maneuvers or whenever the aircraft is being controlled so as to follow a radio beam. This mode may be automatically instituted by operation of suitable detents associated with the control stick C and by switches associated with the beam coupler glide path selector switch (not shown). In the synchronization configuration, the primary input is the aircraft pressure altitude as detected by sensor 140. The rate of climb controller receives any altitude error signal from pick-off 160 and drives its shaft 165 through amplifier 161 and motor 162 in a direction and to an amount to reduce such error to zero and to thereby be positioned in accordance with the existing craft altitude. In this mode the output of the generator 163 corresponds to the craft vertical rate or rate of change of altitude $\dot{h}$ and this signal is applied as an input to the flight path angle computer 122. This signal is compared as by summing network 186 with the product of any signal at the output of sine synchro 184 and true air speed V as derived in the multiplier circuit 170. The resultant or difference of these two signals is applied to flight path angle computer amplifier 180 which drives motor 181 and its output shaft through an angle dependent upon the instantaneous flight path angle of the aircraft thereby solving the equation:

$$\dot{h} = V \sin \gamma \qquad (11)$$

or $$\gamma = \sin^{-1} \frac{\dot{h}}{V} \qquad (12)$$

In this manner a continuous measure of flight path angle is available as in FIGS. 1 and 3, and by means of a suitable pick-off device 187 this signal may be added to a signal proportional to the angle of attack $\alpha$ of the aircraft to thereby provide a continuous computed measure of the pitch attitude of the aircraft in accordance with the relation $$\theta = \gamma + \alpha \qquad (13)$$

This measure may be supplied to an attitude indicator 190 for indicating to the pilot the instantaneous pitch attitude of the aircraft.

The barometric pitch control 122—142 may be operative to control the aircraft in such a manner that it will hold any desired flight path angle. To accomplish this, the flight path angle computer shaft may be clamped at any desired flight path angle reference position after having been established at this reference position by means of control stick steering or by a flight path angle command set in manually by knob 134 and synchro transmitter 171. In this mode, the clamped sine resolver 184 generates a signal proportional to the existing sine $\gamma$ which is multiplied by true air speed V in true air speed multiplier 170, the resultant being used to drive the rate of climb controller 142 at a rate corresponding to the existing flight path angle. In other words, the Equation 11 above is solved and the aircraft, through the autopilot, will be caused to climb or dive at a rate $\dot{h}$ which will produce the set angle of climb or dive $\gamma$ with respect to the horizon.

As stated, any desired flight path angle $\gamma_{co}$ may be selected by means of suitably calibrated selector knob 134. Operation of this knob generates a signal in synchro transmitter 171 and this signal is compared in synchro control transformer 183 with the position of flight path angle computer output shaft and any difference between the two will cause the flight path angle computer to drive in a direction and to an amount to reduce this signal to zero, simultaneously generating the sine $\gamma$ function through generator 184. The rest of the operation of the barometric pitch controller in this mode is the same as in the flight path angle hold mode.

Climbs or descents to predetermined or selected altitudes may be accomplished through an altitude command knob 135 and associated synchro data loop including transmitter 135' and a receiver or control transformer on rate of climb controller shaft 165. However, it will be noted that such climbs or descents will be made at a predetermined constant flight path angle through the flight path angle computer 142 by coupling the altitude command signal $h_{co}$ through this computer as a flight path angle command. Therefore, in order not to command a dangerous attitude, this input is limited as by limiter 189. As before, this predetermined flight path angle is flown through the generation of the rate of climb command input to the rate of climb controller 142 which will command a rate of climb to the autopilot which satisfies Equation 11 above. The operation of the autopilot in response to an altitude displacement or altitude rate error will be set forth below.

It will be evident to those skilled in the art that in the navigation mode the autopilot may be arranged to accept signals from radio navigational systems which supply signals in accordance with the position of the aircraft with respect to predetermined radio defined ground tracks in both bearing and elevation, such as an omnirange and/or localizer receiver and glide slope receiver. These azimuth and elevation radio guidance signals may be converted into control command signals in a radio approach coupler, the outputs of which may be connected into lead 155 in the azimuth channel and into lead 155' in the elevation channel. Thus, these signals are resolved for acceptance by the present autopilot since they are derived in earth-based coordinates.

As stated above, measures of heading and barometric errors or heading and attitude input commands must be converted from earth axes to aircraft axes, and this is accomplished by means of a sine-cosine resolver 88 having its stator fixed with respect to the craft and its rotor angularly positioned by the output shaft of the roll computer 81 in accordance with craft bank angle. The inputs of resolver 88 are heading command $\dot{\psi}_{co}$ and pitch command $\theta_{co}$, and the outputs are quantities proportional to $r_{co}$ and $q_{co}$ which respectively represent the turn rate and pitch rate command components of $\dot{\psi}_{co}$ and $\dot{\theta}_{co}$ which are fed to the lateral and pitch torquers respectively of the director gyro 25. The relationship governing the above resolution is expressed by the following equations:

$$r_{co} = -\dot{\theta}_{co} \sin \phi_{ct} + \dot{\psi}_{co} \cos \phi_{ct} \qquad (14)$$

$$q_{co} = \dot{\theta}_{co} \cos \phi_{ct} + \dot{\psi}_{co} \sin \phi_{ct} \qquad (15)$$

which are substantially the same as Equations 4 and 5 above with slight modification.

Such resolution permits the system to utilize navigation inputs and to maneuver the aircraft in earth coordinates to thereby produce substantially constant altitude turns and to maintain tight control at high bank angles.

The operation of the autopilot in the navigation mode is similar in many respects to the operation in the pilot mode with two major exceptions. (1) In the pitch axis, the altitude error signal, whether it be in the form of an altitude error from a predetermined altitude or an altitude rate error from a predetermined flight path angle reference, is subtracted from the director gyro signal and the resultant signal is applied to the elevator servo system and is a pitch attitude displacement control term (barometric pitch control). Also, the same error signal is applied to the director gyro (through resolver 88) to thereby provide a pitch attitude integral control term. (2) In the turn axis, the heading error signal (converted to craft axes) is applied directly to the director gyro torquer to precess the gyro at a rate proportional to this signal and thereby produce a corresponding turn rate about the craft z-axis. Simultaneously, the bank angle of the craft for this turn rate is computed and fed to both the bank servo system and the roll computer input to thereby cause the craft to bank to the proper bank angle, and simultaneously to cause the roll computer output shaft to be positioned at this bank angle. In many respects this is similar to the system of FIG. 3.

Any output signal of altitude pick-off 160 represents an error of the craft from a constant altitude or from a predetermined altitude rate. This output signal is applied directly to summing circuit 159 through the $K_{h\theta}$ loop 158 which determines the ratio of elevator deflection to feet of altitude error. This signal is subtracted from any signal from the pitch pick-off of director gyro 25 and the difference of the two signals is applied to the elevator servo 140 to cause a pitching of the craft in a direction which will reduce the altitude error. Since pitch attitude displacement is controlled directly by altitude error, the sensor 140 provides a long term pitch reference for the aircraft. The same altitude error signal is applied to the director gyro torquer 34 through the $K_{h\theta}'$ loop 158' (which determines the ratio of precession rate of the director gyro in pitch to feet of altitude error) for integral control purposes. Therefore, if the craft pitch trim is such that it tends to produce a continuous or persistent altitude error, the gyro is slowly precessed in a direction such as to change the pitch trim of the aircraft so as to allow any persistent altitude error to go to zero. Thus, the gyro 25 acts as an integrator for any persistent mistrim of the aircraft in pitch.

The output signal from barometric pitch controller 122—142 is applied to the autopilot to thereby produce an initial change in pitch attitude of the aircraft through loop $K_{h\theta}$. Also, the same signal is applied to resolver 88 to elevation torquer 34, of director gyro 25, through the loop $K_{h\theta}'$ to thereby precess the gyro at a rate proportional to this signal. For example, with an initial flight path angle selection by the pilot, the craft is caused to pitch in the direction of the desired flight path and at the same time the director gyro is caused to precess in the same direction. As a result, the aircraft starts to climb or dive as the case may be and the pitch attitude of the craft as well as the orientation of the director gyro spin axis in elevation will be changed until the rate of climb $h$ for the flight path angle selected is satisfied, this condition being achieved when the output rates of the rate of climb controller shaft 165 and the barometric device 140 are substantially equal and the output of pick-off 160 is substantially zero. When this condition is satisfied, the director gyro 25 stops precessing and the elevators are returned to trim and the craft continues along the desired selected flight path.

Assuming now that it is desired to control the craft in pitch through the pilot's controller C, i.e., control stick steering. In this condition, whenever the pilot's control stick is deflected in a sense to produce a change in pitch of the aircraft, the barometric pitch control switches are moved to their S or synchronizing positions and both the flight path angle computer and the rate of climb controller follow-up on any altitude signal from sensor 140, such that if it is desired to reestablish altitude control or flight path angle control, it may be done without severe switching transients. Operation of the control stick C will produce a signal proportional to the magnitude of its deflection (either force or position), this signal calling for a rate of change in pitch attitude with respect to the earth's horizon, i.e., in earth coordinates. This signal is applied to one of the inputs of resolver 88, the outputs being apportioned to the turn and pitch torquers on director gyro 25 in dependence upon the bank angle of the craft as before. The control stick steering signal produces a deflection of the spin axis of director gyro 25 and the resulting maneuver of the aircraft with respect to the horizon. It will be noted that with control stick steering the operation of the automatic pilot is substantially identical with its operation in the pilot mode, except that in the control stick steering mode the command signals are inserted in earth's coordinates and are, therefore, converted to aircraft coordinates before being applied to the director gyro torquers.

In the operation of the azimuth or turn axis of the autopilot when in the navigation mode, deviations in the heading of the aircraft with respect to a predetermined or selected heading are detected by means of synchro 152 in the heading computer 141. This error signal is applied to resolver 88, the outputs of which are applied to the turn and pitch torquers of the director gyro 25, in accordance with Equations 14 and 15 above. Assuming that the aircraft is flying on a prescribed magnetic heading and that for some reason the craft is caused to depart from this heading. An error signal is generated in synchro 52 and applied to the turn rate computer 82 through resolver 88. Actually, as shown in FIG. 16, this signal goes unmodified through the turn rate computer in this mode of operation since switch 104 is in its N position. Considering for the moment only the component $r_{co}$ of the turn error effective about the craft z-axis; since this error represents a turn error with respect to the z-axis, it is applied directly to the azimuth torquer 35 of director gyro 25 and causes a precession of the latter in a direction at a rate determined by the direction and magnitude of the error signal. The remainder of the operation of the autopilot as a result of this precession is as described in the pilot mode of operation. However, in the navigation mode, the bank angle of the craft is computed in accordance with the commanded turn rate and the true air speed then obtaining. This is accomplished through switch 104 (FIG. 16) in the turn rate computer 82 which feeds an output which is proportional to $$\frac{V_T}{g}$$

to one input of summing circuit 191, the output of which is applied to the input of the roll computer amplifier 83. The output of the amplifier will begin to drive the roll computer motor and hence the output sine synchro 86 of the roll computer, which output is supplied as another input to the summing circuit 191. Therefore, the roll computer will drive through an angle; the sine of which is equal to $$\frac{V_T}{g}$$

as before and hence the roll computer is driven through an angle proportional to the bank angle of the aircraft in accordance with Equation 9 above. Of course, at the same time, rotation of the roll computer output shaft will also cause rotation of the rotor of resolver 88, thereby causing it to perform its resolution function.

It will be noted that the same signal which is applied to the input of the roll computer 81 is also applied to the aileron servo system 55 through the $K_{\phi c}$ loop to thereby command an actual craft bank angle in accordance with the commanded turn rate of the aircraft about its z-axis. If the roll computer precisely computes the correct bank angle for the given turn rate and the aircraft is caused to bank through the same angle, the position of the roll computer shaft will correspond to the actual bank angle of the craft. However, if either the roll computer miscomputed the bank angle or the craft did not achieve the computed bank angle, the aircraft will not turn at the rate commanded, thereby producing an error at the output of director gyro 25. This error, as in the other modes of operation, is applied through the coordination control circuits 58, 61 to the aileron servos to thereby correct the bank angle until it does agree with the bank angle generated at the roll computer 81. In short, in the navigation mode, the craft is caused to bank in an amount proportional to the commanded precession rate of the director gyro which, it will be appreciated, is slightly different from the pilot mode in which gyro precession rate was caused to correspond to command craft bank angle.

Consider now that component $q$ of heading error from heading computer 141 which is effective about the craft pitch or $y$-axis as a result of craft bank angle. Since azimuthal or heading errors of the craft with respect to earth axes are converted to pitch errors through bank angle, the portion of the heading error signal $q_{co}$ under banked conditions is applied to the director gyro pitch torquer to thereby precess the same in pitch in accordance therewith. The remainder of the operation of the pitch axis in the navigation mode is the same as in the pilot mode.

When it is desired to change the heading of the aircraft by a predetermined number of degrees, the pilot need only rotate heading selector knob 144 such that the heading selector pointer 154 is positioned at the desired heading on the compass scale. The signal thereby generated in heading selector synchro 152 is applied to the resolver 88 where the $r_{co}$ and $q_{co}$ components thereof, in accordance with bank angle, are generated. Since the craft rate of turn and therefore its bank angle is dependent upon the magnitude of the heading error, which in this case would be the difference between the present heading and the desired set heading, the limiter 133 is provided which limits the magnitude of this error signal to thereby limit the maximum rate of turn and bank angle capable of being commanded thereby. The $r_{co}$ component of the heading error is applied directly to the lateral torquer of the director gyro and thereby produces a precession rate of the director gyro proportional to the magnitude of the $r_{co}$ signal. Since, as before, this $r_{co}$ signal represents the turn rate of the craft with respect to the craft vertical axis, the same signal is modified in accordance with air speed and gravity, fed to summing circuit 191 and thence to the input of the roll computer which begins to drive in a direction to reduce its input signal as before. the output of sine synchro 86 in the roll computer is also supplied to summing network 191 where it subtracts from the modified $r_{co}$ signal. Thus, the roll computer motor drives until its shaft angular position $\phi_{ct}$ is equal to $$\sin^{-1} \frac{rg}{V}$$

in accordance with Equation 9 above, thereby computing the coordinated bank angle for the turn rate $r_{co}$. Simultaneously, the input to the roll computer is also applied to the aileron servo system to bank the aircraft accordingly. In this manner, the craft is caused to bank and turn at a predetermined rate depending on limiter adjustment (which may be variable to thereby vary maximum bank angle and turn rate) toward the heading set in by the pilot. The opposite sequence of events occurs as the new heading is approached, that is, the heading error signal comes out of limits and the rate of turn command will thus be reduced, and hence the bank angle also will be reduced, all signals going to zero when the new heading is achieved.

As in the pitch axis, earth-referenced turn commands may be put in by control stick steering and under this condition control stick steering switches 164 are closed as before. The switch 164' associated with the heading computer 141 serves to mechanically couple the stator 153 to the rotor 151 of the heading selector synchro 152. This is accomplished by means of an electromechanical clutch 132. Thus, no heading error signal is generated and both compass pointer 149 and heading selector pointer 154 of FIG. 15 are caused to be driven in synchronism. In this manner, control stick steering turn signals in earth references are supplied to resolver 88 where they are apportioned between pitch and yaw torquers of director gyro 25, as hereinabove described. It will be understood that the clutch arrangement is illustrative only and that the same results could be accomplished through other means, for example, a further follow-up on compass heading which is made to follow-up during turn commands and which may be clamped for straight flight.

*Disengaged Mode*

In order that the automatic pilot of the present invention may be engaged without any severe engage transients, the system may be turned on and caused to follow all maneuvers of the aircraft without influencing any control action thereover. For this purpose, the servo system is disengaged from the control surfaces of the aircraft. This mode of operation is instituted by the pilot's engage-disengaged selector switch 23 illustrated generally in FIG. 1. Operation of this switch places suitable selector switch wafers controlled thereby (but not specifically shown) in their disengaged positions and the system is converted to that shown by block diagrams in FIGS 13 and 14.

Referring first to FIG. 13, it will be seen that the output of the director gyro 25 is fed back to the input of the pitch axis torquer 34 thereof so that the spin axis of the director gyro in pitch is caused to follow all pitch movements of the aircraft. Also, the same signal is applied to buck out any signal from the pitch rate gyro 42 until the wipe-out 45 becomes effective, as in the pilot mode of operation. Thus, upon engagement of the control surfaces with the elevator servo, even under changing pitch conditions, the airplane will be maintained in the attitude it held at the time of engagement without any transients.

The lateral axis of the automatic pilot of the present invention in the disengaged mode is similar in some respects to the navigation mode. As shown in FIG. 14, the output of the director gyro 25, which is proportional to the turn rate of the aircraft about its $z$-axis, is applied as the input to the turn rate computer 82 that is, the director gyro 25 is placed in follow-up on yaw error and the precession rate is, therefore, equal to the $z$-axis turn rate. In other words, the director gyro output is its own turn rate command input. Thus, since the turn rate of the aircraft is being measured, this measure is supplied as an input to the roll computer 81 and the output signal of sine synchro 86 on the roll computer output shaft is equated to this turn rate signal (modified by $V_T$ and $g$) and Equation 9 above is solved, as in the navigation mode, and the roll computer shaft is therefore positioned through an angle proportional to the actual bank angle of the airplane. In the bank axis during disengagement, the servos are controlled jointly by the output of roll rate gyro 52 and any coordination control signal from director gyro 25.

From the foregoing, it will be seen that prior to engagement, roll computer angle is made equal to the airplane roll angle, and in the system illustrated in FIGS. 13 and 14, upon engagement of the servos to the control surfaces and with the pilot's control column in detent, the roll computer is clamped and the airplane will be maintained at the turn rate existing at engagement. However, if desired, further switching may be provided such that upon engagement of the surfaces with their servos the craft may be caused to roll to level flight and maintain the heading then obtained. This may be accomplished by leaving the roll computer unclamped upon engagement so that with the stick in detent the system will be placed in the roll out mode and will roll to level attitude as will be described.

While the director gyro configuration of the present invention above described is preferred because of its comparable compactness, light weight, etc., it will be understood that the invention in its broader aspects need not be restricted to this specific gyro configuration. For example, two integrating rate gyros could be employed, one responsive to motions of the aircraft about the yaw axis and the other responsive to motions thereof about the pitch axis. In either case, the basic principles of the present invention are equally applicable and the results obtained would be substantially identical.

Also, it will be noted that inasmuch as the roll attitude of the craft is always available as a result of roll computer operation, roll attitude of the aircraft may be continuously indicated to the pilot by means of a roll attitude indicator positioned directly by the roll computer output shaft (as in the case of the heading computer) or through a remote roll indicator controlled in accordance with the position of the roll computer output shaft. It is further possible, if desired, to slave a vertical gyro from the roll computer, thereby eliminating turn error encountered with gravity responsive erectors. Likewise, in the pitch axis, pitch attitude information is continuously available through operation of the barometric pitch control 122—142 as above described, using flight path angle and/or measured angle of attack, and rate of climb.

It will also be appreciated that some of the components of the automatic pilot may be placed in control of the aircraft while other control components may be rendered ineffective to control the aircraft. Such a condition is contemplated in the system illustrated for enabling the autopilot to be used for stability augmentation purposes. This may be accomplished in the present system by removing, through switching, all autopilot inputs to the surface servo systems except those signals derived from the yaw, pitch and roll rate gyros.

It will be understood that in the present disclosure various and numerous switches would be required for converting the system from one flight configuration to another flight configuration, and it will be understood that such switching would be obvious to one skilled in the art and a detailed showing thereof has been omitted for the sake of clarity. Also certain interlocks between various switches are necessary such that mutually incompatible signals are never intermixed or inserted into the system. It is considered that such very detailed switching need not be illustrated since once the principles of the invention are clearly understood from the foregoing this switching may readily be accomplished by established engineering practice.

While the invention has been described in its preferred embodiments, it is to be understood that the words which have been used are words of description rather than of limitation and that changes within the purview of the appended claims may be made without departing from the true scope and spirit of the invention in its broader aspects.

Glossary of Symbols

Subscript "co" denotes command signal
Subscript "ct" denotes computed signal
Subscript "AP" denotes of the airplane
Subscript "g" denotes gyro signal $\theta$—Pitch angle ⎫
$\psi$—Yaw angle ⎬ Earth axes
$\phi$—Roll angle ⎭
$\dot{\theta}$—Pitch rate ⎫
$\dot{\psi}$—Yaw rate ⎬ Earth axes
$\dot{\phi}$—Roll rate ⎭
$q$—Pitch rate ⎫
$r$—Yaw rate ⎬ Airplane axes
$p$—Roll rate ⎭
$\theta_e$—Pitch deviation from director gyro spin axis ⎫
$\psi_e$—Yaw deviation from director gyro spin axis ⎬ Airplane axes $\theta_T$—Error between craft x-axis and the craft velocity vector
$\theta_{Tr}$—Elevation track error
$\psi_{Tr}$—Azimuth track error
$V$—True air speed
$h$—Altitude
$\dot{h}$—Altitude rate
$\gamma$—Flight path angle
$\alpha$—Angle of attack
$g$—Acceleration of gravity constant
$\sigma$—Apparent gravity angle
$K$—Gain constant
$K_\theta$—Degrees of elevator per degree of pitch error
$K_{\dot{\theta}}$—Degrees of elevator per degree per second of pitch rate
$K_\psi$—Degrees of rudder per degree of yaw error
$K_{\dot{\psi}}$—Degrees of rudder per degree per second of yaw rate
$K_c$—Degrees of aileron per degree of yaw error
$K_{\dot{c}}$—Degrees of aileron per degree per second of yaw error
$K_{\dot{\phi}}$—Degrees of aileron per degree per second of roll rate
$K_{\dot{\phi}c}$—Degrees per second of command per degree per second of roll rate
$K_{\theta c}$—Degrees of elevator per degree per second of pitch rate command
$K_{\theta\dot{\theta}}$—Degrees per second of director gyro precession rate in pitch per degree of pitch error
$K_{\psi\dot{\psi}}$—Degrees per second of director gyro precession rate in yaw per degree of yaw error
$K_{\psi\dot{\phi}}$—Degrees per second of roll computer rate per degree of yaw error
$K_{\dot{\phi}\psi}$—Degrees of rudder per degree per second of roll rate command
$K_T$—Degrees per second of roll rate command per degree of azimuth track error
$K_{\theta h}$—Degrees of elevator per foot of altitude error
$K_{h\dot{\theta}}$—Degrees per second of director gyro precession rate in pitch per foot of altitude error

What is claimed is:

1. In a stabilization system for an aircraft having yaw and roll control surfaces and servomotor means for driving said surfaces, the combination comprising, gyroscopic means defining a directive axis in space, signal generating means coupled with said gyroscopic means for supplying a signal in accordance with deviations in yaw between said directive space axis and the fore-and-aft axis of said craft, means responsive to said yaw deviation signal for providing a signal in accordance with the first time derivative thereof, means for supplying said deviation signal to said yaw control surface sermomotor means, and means for supplying said deviation signal and said derivative signal to said roll control surface servomotor means.

2. In a stabilization system for an aircraft having yaw and roll control surfaces and servomotor means for driving said surfaces, the combination comprising, means for supplying a first signal in accordance with the rate of yaw of said aircraft, means for supplying a second signal in accordance with the rate of roll of said aircraft, gyroscopic means for defining an axis in space normally substantially parallel to the fore-and-aft axis of said aircraft, signal generating means coupled with said gyroscopic means for supplying a third signal proportional to angular displacement in yaw between said gyro axis and said craft fore-and-aft axis, means responsive to said displacement signal for supplying a fourth signal in accordance with the rate of change thereof, means responsive to said first and third signals for controlling said yaw control surface servomotor means, and means responsive to said second third and fourth, and said rate of change of displacement signals for controlling said roll control surface servomotor means.

3. In an automatic pilot for aircraft, in combination, director type gyroscope means for defining a reference axis in space, means for precessing said gyroscope means whereby to change the space orientation of said reference axis, means for supplying a signal corresponding to a desired rate of turn of said craft, computer means responsive to said desired turn rate signal for computing the bank angle required for a coordinated turn corresponding to said desired turn rate, and means responsive to one of said last two mentioned means for supplying a control signal to said gyroscope precessing means whereby to precess said gyroscope means at a rate corresponding to said desired turn rate.

4. An automatic pilot for aircraft having turn and bank control surfaces for controlling the orientation of the fore-and-aft axis thereof comprising, director type gyroscopic means for defining a reference axis in space normally parallel to the craft fore-and-aft axis and means operated thereby for controlling said turn control surface to cause said craft fore-and-aft axis to tend to follow said reference axis, means coupled with said gyroscopic means for precessing said reference axis in space at a predetermined rate whereby to tend to cause said craft to turn at said predetermined rate, means for supplying a turn command signal, computer means responsive to said turn command signal for computing the bank angle required for a coordinated turn corresponding to said predetermined precession rate, and means responsive to one of said last two mentioned means for supplying a control signal to said reference axis precessing means and simultaneously to said bank control surface, whereby to cause said craft to bank and turn at a rate corresponding to the precession rate of said reference axis.

5. In an automatic pilot for aircraft in which director type gyroscopic means are provided having a spin axis defining a reference axis in space and including means controlled in accordance with the space orientation of said spin axis for operating the craft control surfaces in a manner to cause the orientation of the longitudinal axis of the craft to be maintained substantially parallel with the orientation of the spin axis of said gyroscopic means comprising, precessing means coupled with said gyroscopic means for changing the space orientation of the spin axis thereof, means for providing a signal corresponding to a desired change in the orientation of said craft axis, means for supplying said signal to said precessing means whereby to precess said spin axis at a rate dependent upon said signal, and further means responsive to said signal for computing the craft attitude required for a coordinated turn corresponding to the precession rate of said spin axis produced by said signal.

6. In an automatic pilot for aircraft director type gyroscopic means having a spin axis defining a reference axis in space and including means controlled in accordance with the space orientation of said spin axis for operating the craft control surfaces in a manner to cause the orientation of the longitudinal axis of the craft to be maintained substantially parallel with said spin axis precessing means coupled with said gyroscopic means for changing the space orientation of the spin axis thereof, means for providing a signal corresponding to a desired change in the orientation of said craft axis, means for supplying said signal to said precessing means whereby to precess said spin axis at a rate dependent upon said signal, and means including means responsive to craft air speed and said signal for computing the craft bank angle required for a coordinated turn corresponding to the precession rate of said gyroscope.

7. An autopilot for aircraft having bank and yaw control surfaces for controlling the orientation of the longitudinal axis thereof comprising, a director type free gyroscope the spin axis of which defines a reference axis in space, means responsive to the orientation of said gyroscope spin axis for operating said yaw control surface in a manner to cause said craft longitudinal axis normally to follow said gyroscope spin axis, precessing means coupled with said gyroscope for changing the space orientation of said spin axis, means for providing a control signal variable in accordance with a desired change in the orientation of said craft longitudinal axis, means for supplying said control signal to said gyroscope precessing means whereby to cause said spin axis to precess at a rate corresponding to said control signal, means also responsive to said control signal for computing the bank angle required for a coordinated turn of said longitudinal axis corresponding to the precession rate of said spin axis produced by said control signal, and further means responsive to said control signal for operating said bank control surface whereby further to control the orientation of said craft longitudinal axis in accordance with the precession of said spin axis.

8. An automatic pilot as set forth in claim 7 wherein said further means for operating said bank control surface includes means responsive to the operation of said bank angle computing means.

9. An automatic pilot for aircraft having yaw and roll control surfaces for controlling the orientation of the craft fore-and-aft axis, the combination comprising, gyroscopic means for defining a reference axis in space, precessing means coupled with said gyroscopic means for precessing the same, means for producing a control signal in accordance with the desired rate of roll of said aircraft, means for supplying said control signal to said roll control surface for producing a corresponding rate of roll of said aircraft, means responsive to said roll rate signal for integrating the same to thereby provide a measure of the bank angle of the craft, computer means responsive to said bank angle measure for computing the turn rate of said aircraft corresponding to said bank angle as a function of craft air speed, means responsive to the output of said computer means for controlling said precessing means whereby to precess said reference axis at a rate corresponding to the turn rate of said craft produced by said bank angle, and means responsive to said gyroscopic means for controlling said yaw control surface.

10. Apparatus as set forth in claim 9 including further turn coordination means responsive to precession of said gyroscopic means for additionally controlling said roll control surface.

11. Apparatus as set forth in claim 9 including further means for producing a signal in accordance with the angle of attack of said aircraft, and means for further controlling said precessing means in accordance with said angle of attack signal.

12. An automatic pilot for aircraft having control surfaces for controlling yaw and roll of said aircraft, the combination comprising, inertial reference means for defining a space reference axis normally substantially parallel with the longitudinal axis of the aircraft, means for supplying a signal proportional to a desired rate of roll of said aircraft, motor means responsive to said signal for causing banking of said craft and a resulting integration of said signal by said craft, computer means responsive to said roll rate signal for integrating the same to thereby provide an output in accordance with the computed bank angle of said craft, air speed measuring means responsive to the output of said computer means for providing a signal proportional to the rate of yaw of said aircraft for said bank angle and craft air speed, means responsive to said last-mentioned signal for precessing said reference means at said yaw rate, and means responsive to the difference between the precession rate of said reference means and the actual rate of yaw of said craft longitudinal axis due to said bank angle for further controlling said craft bank angle in a sense to reduce said difference toward zero whereby the craft bank angle is made substantially equal to the said computed bank angle.

13. In an automatic pilot of the character set forth in claim 12, further including switch means for removing said desired rate of roll signal from the input of said computer means and for substituting therefor a signal corresponding to the output of said computer means whereby to cause said craft to roll to a level flight attitude as said computer means reduces its output to zero.

14. An aircraft automatic pilot comprising means for providing a signal proportional to a desired rate of yaw of said craft, means for providing a measure of the air speed of said craft, motive means for positioning a member in accordance with the product of said rate of yaw signal and said air speed measure, means driven by said member for providing a feedback signal to said motive means proportional to a trigonometric function of the position thereof whereby to position said motive means in accordance with the bank angle of said craft corresponding to said desired craft yaw rate and air speed, aileron servomotor means for controlling aircraft bank angle, and means for controlling said servomotor in accordance with the operation of said motive means whereby to establish a craft bank angle proportional to the desired rate of yaw.

15. Apparatus as set forth in claim 14, including further means responsive to a mismatch between said desired yaw rate and the actual yaw rate of said craft for further controlling the bank angle of said craft in a sense to eliminate said mismatch and thereby make said actual craft bank angle agree with the position of said motive means.

16. A bank angle reference device for an aircraft automatic pilot comprising, means for measuring the rate of turn of said aircraft about the vertical axis thereof and for providing a first signal proportional thereto, means for measuring the air speed of said aircraft and for providing a second signal proportional thereto, means for combining said signals for supplying a third signal proportional to the product thereof, computer means responsive to said first and second signals for determining the bank angle of the craft as a function thereof including a follow-up servo loop, motor means responsive to said first and second signals for producing a shaft rotation, and means responsive to said shaft rotation for providing a feed back signal in said servo loop proportional to a trigonometric function of said shaft rotation relating the required bank angle of the aircraft to the measured yaw rate and air speed whereby to provide a measure of the bank angle for said craft turn rate and air speed.

17. Apparatus as set forth in claim 16 wherein said trigonometric function is the sine function and the relation thereof to the measured yaw rate and air speed is given by the equation $$\sin \phi = \frac{V}{g} r$$

where $\phi$ is the bank angle, $r$ the measured rate of yaw, $V$ the measured air speed, and $g$ the acceleration of gravity constant.

18. A roll and pitch reference apparatus for aircraft automatic pilots comprising, means for providing a signal in accordance with the air speed of the aircraft, means for providing a signal in accordance with the rate of yaw thereof, first computer means including a motor means responsive to said yaw rate and air speed signals for providing a shaft rotation, means for modifying the operation of said first computer means in accordance with a trigonometric function of said shaft rotation relating the required bank angle of said aircraft to said measured yaw rate and air speed whereby to provide a computed measure of the bank attitude of said aircraft, means for providing a signal in accordance with the rate of climb of said aircraft, second computer means including a second motor means responsive to said rate of climb signal and said air speed signal for providing a second shaft rotation, means for modifying the operation of said second computer means in accordance with a trigonometric function of said second shaft rotation relating the flight path angle of the craft relative to the horizontal to said measured climb rate and air speed whereby to provide a computed measure of the flight path angle of the aircraft.

19. Apparatus as set forth in claim 18, further including means responsive to said flight path angle measure for providing a measure of the pitch attitude of said aircraft.

20. Apparatus as set forth in claim 19 wherein said last-mentioned means includes means for providing a measure of the angle of attack of said aircraft and means for modifying said flight path angle measure in accordance therewith whereby to provide a measure of the pitch attitude of said craft.

21. An automatic pilot for aircraft having yaw and roll control surfaces for controlling the orientation of the longitudinal axis of said aircraft and servomotor means for controlling said surfaces, in combination, gyroscopic means defining an axis in space and means controlled thereby for controlling said servos whereby to maintain said aircraft fore-and-aft axis normally parallel with said gyroscopically defined axis, means for precessing said gyroscopic means with respect to said fore-and-aft aircraft axis, means for producing a signal in accordance with a desired turn rate of said craft with respect to the earth, means for modifying said signal in accordance with craft bank angle, means for precessing said spin axis in accordance with said modified signal whereby to produce a turn of said aircraft with respect to earth axes, computer means responsive to said modified signal for computing the craft bank angle in terms of said craft rate of turn, and means responsive to said computer means for controlling said modifying means in accordance with said computed bank angle.

22. An automatic stabilization system for aircraft having pitch, yaw and roll control surfaces for controlling the direction of flight of said aircraft and servomotor systems for actuating said surfaces, in combination, gyroscopic means pivotally mounted in said aircraft for freedom about the yaw and pitch axes whereby to define a reference axis in space normally parallel to the desired direction of flight of said aircraft, means coupled with said gyroscopic means for providing signals proportional to the yaw and pitch displacement of said craft from said reference axis, means for supplying said pitch displacement signal to said pitch control surface servomotor system for controlling the pitch attitude in a direction and to an amount to reduce said pitch signal toward zero, means for supplying said yaw displacement signal to said yaw control surface for controlling the yaw attitude in a direction and to an amount to reduce said yaw signal toward zero, means for supplying a signal proportional to the rate of change of said yaw displacement signal, and means for supplying said yaw displacement and yaw rate signals to said roll surface servomotor for controlling the roll angle of said craft in accordance with the algebraic sum thereof whereby the bank angle of said craft is zero when the direction of flight of said aircraft is parallel to said gyroscopic reference axis.

23. An atutomatic control system aircraft having control surfaces for controlling the bank and turn of the aircraft and thereby to control the orientation of the fore-and-aft axis thereof comprising, gyroscopic means for defining a reference axis in space, means for precessing said reference axis, means for supplying a turn command signal in accordance with a desired bank movement of said craft, means for controlling said roll control surface in accordance with said bank signal whereby to produce banking of said craft, means for producing a signal in accordance with the roll rate of said aircraft, means for integrating said roll rate signal whereby to produce the signal in accordance with the instantaneous bank angle of said craft, means for computing the coordinated turn rate of said aircraft for said bank angle, and means for controlling said reference axis precessing means in accordance with the output of said computer whereby to cause said reference axis to be precessed at a rate corresponding to said bank angle.

24. An automatic pilot for aircraft having control surfaces for controlling the pitch attitude thereof, comprising gyroscopic means for defining a reference axis in space and means responsive thereto for controlling said control surface whereby to control the pitch attitude of said aircraft through said gyroscopic means, means adapted to precess said gyroscopic means whereby to change the orientation of said reference axis in space, means providing a command signal in accordance with deviation of said craft from a predetermined flight path in elevation, means responsive to said deviation signal for directly controlling said control surface in accordance therewith whereby to directly control the craft pitch attitude, and means for additionally supplying said deviation signal to said precessing means whereby to change the orientation of said gyroscopic reference axis in accordance therewith.

25. Apparatus as set forth in claim 24 wherein said deviation signal providing means includes means for providing a measure of the angle of the flight path of the aircraft with respect to the horizon and means responsive thereto for providing a signal upon deviations of said craft from said flight path.

26. Apparatus as set forth in claim 24 wherein said deviation signal providing means includes an altimeter and means responsive thereto for providing a signal in accordance with deviations of said craft from a predetermined altitude.

27. An automatic pilot for aircraft having control surfaces for controlling the roll attitude of the aircraft comprising, means for providing a signal in accordance with a desired rate of roll of said aircraft, means for supplying said signal to said roll control surfaces whereby to cause said craft to bank at a rate dependent upon the magnitude and through an angle dependent upon the duration of said signal, computer means including means responsive to said signal for integrating the same and to thereby provide a signal proportional to the time integral of said signal and means responsive to the air speed of said craft and to said integral signal for computing a turn rate of the aircraft, means responsive to the actual turn rate of the aircraft produced by said craft bank angle for providing a signal dependent upon the difference between said actual turn rate and said computed turn rate, and means responsive to said difference signal for further controlling said craft bank angle in a direction and to an amount to reduce said difference signal to zero, whereby said actual craft bank angle is made substantially the same as said computed bank angle.

28. An automatic pilot for aircraft having yaw, pitch and roll control surfaces for controlling the attitude of the craft about these axes and servomotor means for controlling each of said surfaces, the combination comprising angular rate responsive means for supplying signals respectively proportional to the angular rate of change of craft attitude about said yaw, pitch and roll axes, means for supplying said rate signals to said servomotor means in a sense to oppose transient movements of said craft about said axes, a free gyroscope universally supported in said craft with its spin axis normally substantially parallel to the roll axis of said craft whereby to provide a yaw and pitch displacement reference axis for said aircraft, signal producing means coupled with said gyroscope and responsive to relative angular displacements of said craft about said yaw and pitch axes for supplying control signals in accordance with such displacements, means for supplying said yaw and pitch control signals to said yaw and pitch servomotors respectively whereby to maintain said craft roll axis substantially parallel with said gyroscope spin axis, means responsive to said yaw control signal for deriving therefrom a roll displacement signal, means for supplying said roll signal to said roll control surface, whereby said gyroscope provides a roll displacement reference for said aircraft, means coupled with said gyroscope for precessing the same about said yaw and pitch axes whereby to change its orientation in space, means for providing yaw, pitch and roll command signals proportional to desired angular rates of movement of said craft about said craft axes, means for supplying said yaw and pitch rate command signals to said gyro precessing means, and means for combining said yaw, pitch and roll rate command signals in opposition with said yaw, pitch and roll rate signals, respectively, whereby to suppress said rate signals and allow said craft to turn at the commanded rate.

29. In an automatic pilot for aircraft having yaw and pitch control surfaces for controlling the attitude of the craft about the craft yaw and pitch axes, respectively, and servomotor means for controlling said surfaces, the combination comprising a free gyroscope universally supported in said craft with its spin axis normally substantially parallel with the longitudinal axis of the aircraft, yaw and pitch angular rate responsive means for supplying signals in accordance with angular rates of movement of said craft about said axes, means for supplying command signals proportional respectively to desired rates of movement of said craft about said axes, means responsive to said command signals for changing the orientation of the spin axis of said gyroscope in accordance therewith whereby to change the orientation of said craft about said axes, and means for combining said yaw and pitch rate command signals in opposition with said yaw and pitch rate signals respectively whereby to allow the longitudinal axis of said craft to be changed in accordance with the precession of said gyroscope spin axis without opposition from said angular rate responsive means.

30. In an automatic pilot for aircraft having yaw and pitch control surfaces for controlling the attitude of the craft about its yaw and pitch axes, and servomotor means for controlling said surfaces, the combination comprising a free gyroscope universally supported in said craft with its spin axis normally substantially parallel with the longitudinal axis of the aircraft, yaw and pitch angular rate responsive means for supplying signals in accordance with angular rates of movement of said craft about said axes, means for precessing said gyroscope about said yaw and pitch axes whereby to change the orientation of said craft longitudinal axis about these axes, means for supplying command signals proportional respectively to desired rates of movement of said craft about the craft roll and pitch axes, means responsive to said roll rate command signal for computing a corresponding yaw rate command signal, and means for combining said yaw and pitch rate command signals in opposition with said yaw and pitch rate signals respectively whereby to allow the longitudinal axis of said craft to be changed in accordance with the precession of said gyroscope spin axis without opposition from said angular rate responsive means.

31. An automatic pilot for aircraft having control surfaces for controlling the pitch attitude thereof, comprising gyroscopic means for defining a reference axis in space and means responsive thereto for controlling said control surface whereby to control the pitch attitude of said aircraft through said gyroscopic means, means adapted to precess said gyroscopic means whereby to change the orientation of said reference axis in space, means for providing a command signal in accordance with a desired rate of change of pitch attitude of said aircraft, means for supplying said command signal to said gyroscope precessing means whereby to precess said reference axis at a rate dependent upon said command signal and thereby to tend to cause said craft to pitch at a corresponding rate, and means responsive to said command signal for directly controlling said control surface in accordance therewith whereby to reduce any lag between the longitudinal axis of said craft ands aid gyroscope reference axis produced by the inertia of said craft.

(References on following page)

References Cited in the file of this patent

UNITED STATES PATENTS

| | | |
|---|---|---|
| 1,801,948 | Boykow | Apr. 21, 1931 |
| 1,825,994 | Cooke | Oct. 6, 1931 |
| 2,286,561 | Meredith | June 16, 1942 |
| 2,325,108 | Carlson | July 27, 1943 |
| 2,539,411 | Esval et al. | Jan. 30, 1951 |
| 2,636,698 | Owen et al. | Apr. 28, 1953 |
| 2,772,059 | Noxon et al. | Jan. 27, 1956 |

FOREIGN PATENTS

| | | |
|---|---|---|
| 57,079 | France | Aug. 6, 1952 |